United States Patent [19]
Matsushima et al.

[11] Patent Number: 5,007,099
[45] Date of Patent: Apr. 9, 1991

[54] DATA FILTERING METHOD

[75] Inventors: Hitoshi Matsushima, Tachikawa; Takafumi Miyatake, Hachioji, both of Japan

[73] Assignees: Hitachi, Ltd., Tokyo, Japan; Hitachi, Ltd., Tokyo, Japan

[21] Appl. No.: 213,133

[22] Filed: Jun. 29, 1988

[30] Foreign Application Priority Data

Jun. 29, 1987 [JP] Japan .................................. 62-159594

[51] Int. Cl.⁵ .............................................. G06K 9/00
[52] U.S. Cl. ...................................... 382/41; 382/54; 382/56; 364/724.05
[58] Field of Search ............................ 382/41, 56, 54; 364/724.05

[56] References Cited
U.S. PATENT DOCUMENTS 4,375,081 2/1983 Blesser ............................ 364/724.05

Primary Examiner—David K. Moore
Assistant Examiner—Daniel Santos
Attorney, Agent, or Firm—Antonelli, Terry, Stout & Kraus; Antonelli, Terry, Stour & Kraus

[57] ABSTRACT

In an image filtering system including an input device for inputting image data, a memory unit for storing an image data or the result derived by performing operation on the input image data, an arithmetic unit for performing operations between the image data inputted by the input device or between the input image data and the image data stored in the memory unit or between the image data stored in the memory unit, a loading unit for storing the results of the operation performed by the arithmetic unit in the memory, and an addressing device for designating the addresses of the memory in or from which the data is to be written or read out, an image filtering method in which a predetermined operation is performed $3(n-1)$ times on $2n$ inputs or input rows of the image data succeeding one another in a predetermined direction with a filter of a size n, to thereby determine $(n+1)$ results or rows thereof.

26 Claims, 19 Drawing Sheets

FIG. IC
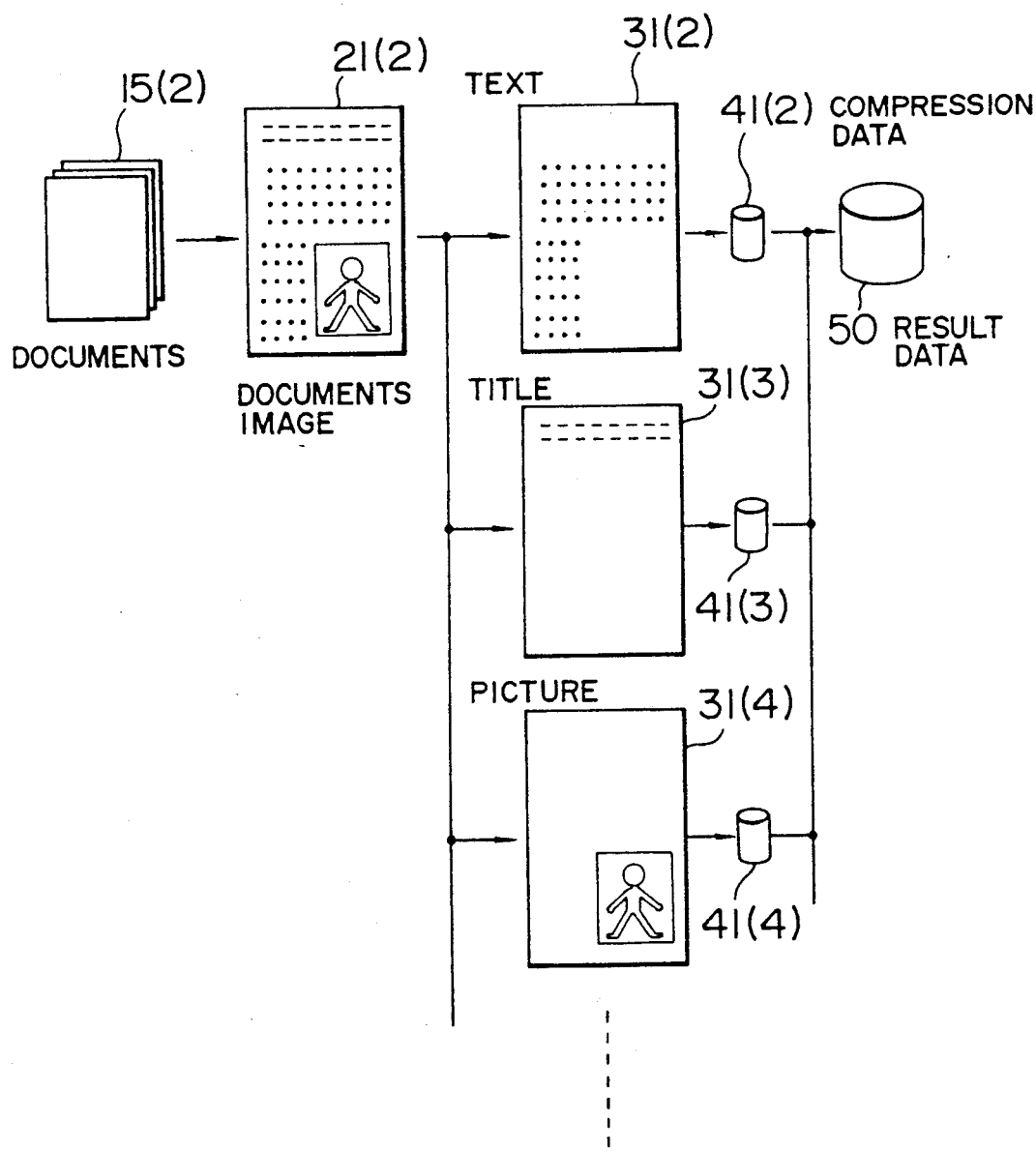

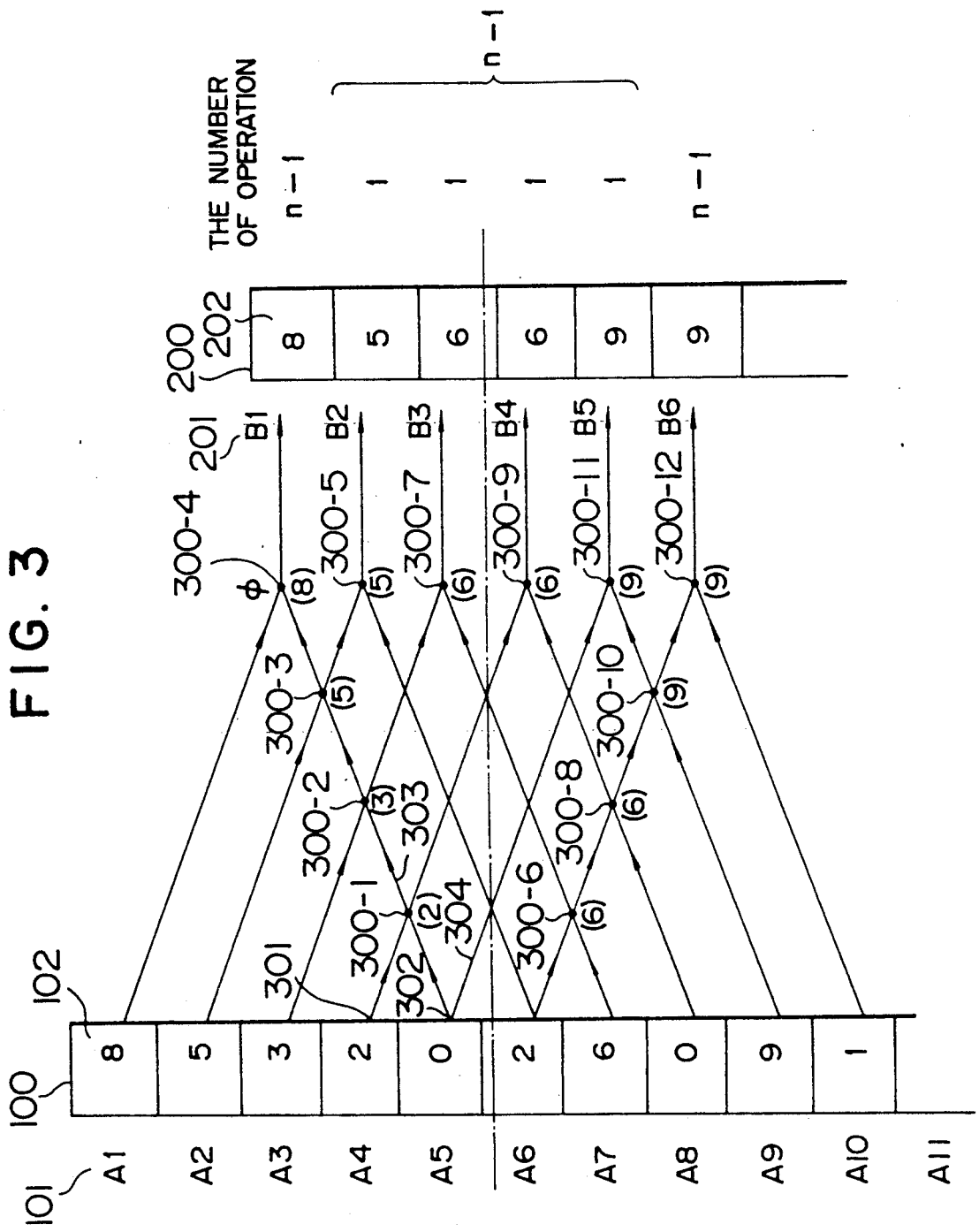

FIG. 4B

| | OPERAND $I_1$ (103) | | OPERAND $I_2$ (307) | | OUTPUT OF ALU OPERATION $\psi(A,B)$ (302) | | RESULT OF FILTERING OPERATION (305, 200) |
|---|---|---|---|---|---|---|---|
| | ADDRESS | VALUE ~101 | ADDRESS | VALUE | ADDRESS | VALUE | |
| 1 | n−1 | $A_{n-1}$ | n | $A_n$ | n−1 | $\psi(d_{n-1},d_n)=\phi(n-1,n)$ | |
| 2 | n−2 | $A_{n-2}$ | n−1 | $\phi(n-1,n)$ | n−2 | $\psi(d_{n-2},\phi(n-1,n))=\phi(n-2,n)$ | |
| 3 | n−3 | $A_{n-3}$ | n−2 | $\phi(n-2,n)$ | n−3 | $\phi(n-3,n)$ | |
| ⋮ | ⋮ | ⋮ | ⋮ | ⋮ | ⋮ | ⋮ | |
| n−2 | 2 | $A_2$ | 3 | $\phi(3,n)$ | 2 | $\phi(2,n)$ | |
| n−1 | 1 | $A_1$ | 2 | $\phi(2,n)$ | | $\phi(1,n)$ | $B_1$ |
| n | 2 | $\phi(2,n)$ | n+1 | $A_{n+1}$ | | $\phi(2,n+1)$ | $B_2$ |
| n+1 | n+1 | $A_{n+1}$ | n+2 | $A_{n+2}$ | n+1 | $\psi(d_{n+1},d_{n+2})=\phi(n+1,n+2)$ | |
| n+2 | 3 | $\phi(3,n)$ | n+1 | $\phi(n+1,n+2)$ | | $\phi(3,n+2)$ | $B_3$ |
| n+3 | n+1 | $\phi(n+1,n+2)$ | n+3 | $d_{n+3}$ | n+1 | $\phi(n+1,n+3)$ | |
| ⋮ | ⋮ | ⋮ | ⋮ | ⋮ | ⋮ | ⋮ | ⋮ |
| 3n−8 | n−2 | $\phi(n-2,n)$ | n+1 | $\phi(n+1,2n-3)$ | | $\phi(n-2,2n-3)$ | $B_{n-2}$ |
| 3n−7 | n+1 | $\phi(n+1,2n-3)$ | 2n−2 | $d_{2n-2}$ | n+1 | $\phi(n+1,2n-2)$ | |
| 3n−6 | n−1 | $\phi(n-1,n)$ | n+1 | $\phi(n+1,2n-2)$ | | $\phi(n-1,2n-2)$ | $B_{n-1}$ |
| 3n−5 | n+1 | $\phi(n+1,2n-2)$ | 2n−1 | $d_{2n-1}$ | n+1 | $\phi(n+1,2n-1)$ | |
| 3n−4 | n | $A_n$ | n+1 | $\phi(n+1,2n-1)$ | | $\phi(n,2n-1)$ | $B_n$ |
| 3n−3 | n+1 | $\phi(n+1,2n-1)$ | 2n | $A_{2n}$ | | $\phi(n+1,2n)$ | $B_{n+1}$ |
| 3n−2 | 2n | $A_{2n}$ | 2n+1 | $A_{2n+1}$ | 2n | $\psi(d_{2n},d_{2n+1})=\phi(2n,2n+1)$ | |
| 3n−1 | 2n−1 | $A_{2n-1}$ | 2n | $\phi(2n,2n+1)$ | 2n−1 | $\phi(2n-1,2n+1)$ | |
| 3n | 2n−2 | $A_{2n-2}$ | 2n−1 | $\phi(2n-1,2n+1)$ | 2n−2 | $\phi(2n-2,2n+1)$ | |
| ⋮ | ⋮ | ⋮ | ⋮ | ⋮ | ⋮ | ⋮ | |
| 4n−3 | n+3 | $A_{n+3}$ | n+4 | $\phi(n+4,2n+1)$ | n+3 | $\phi(n+3,2n+1)$ | |
| 4n−4 | n+2 | $A_{n+2}$ | n+3 | $\phi(n+3,2n+1)$ | | $\phi(n+2,2n+1)$ | $B_{n+2}$ |
| ⋮ | ⋮ | ⋮ | ⋮ | ⋮ | ⋮ | ⋮ | |

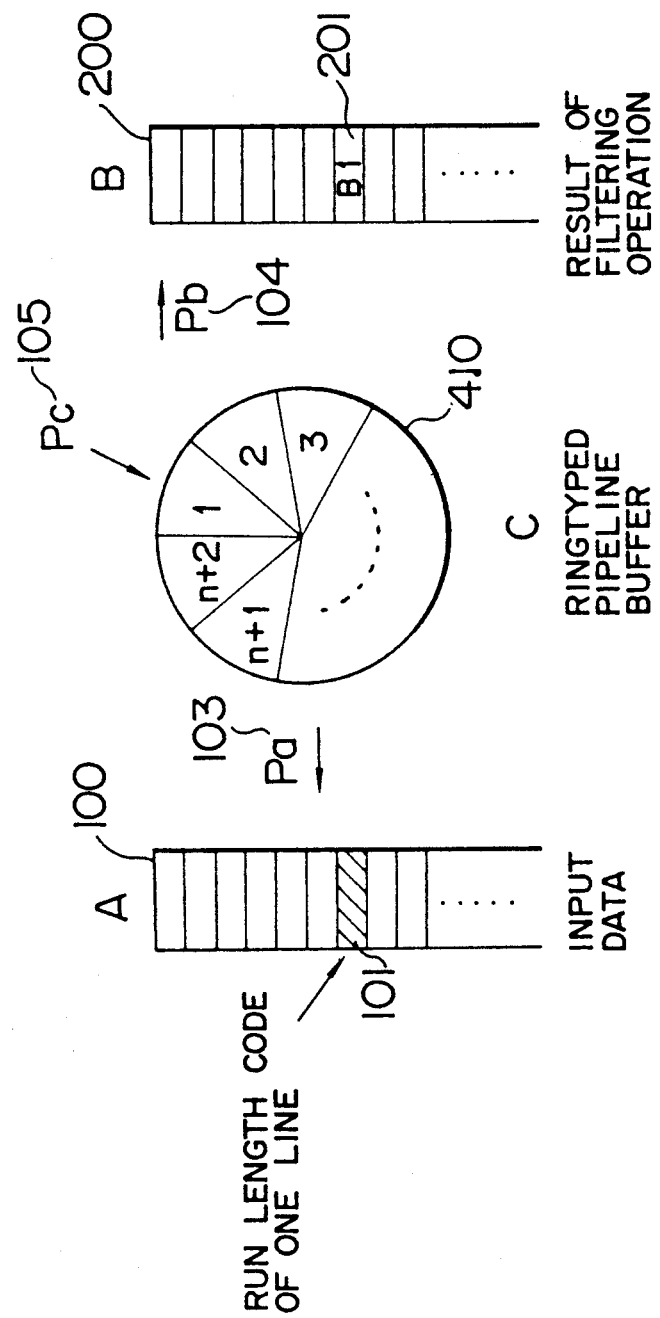

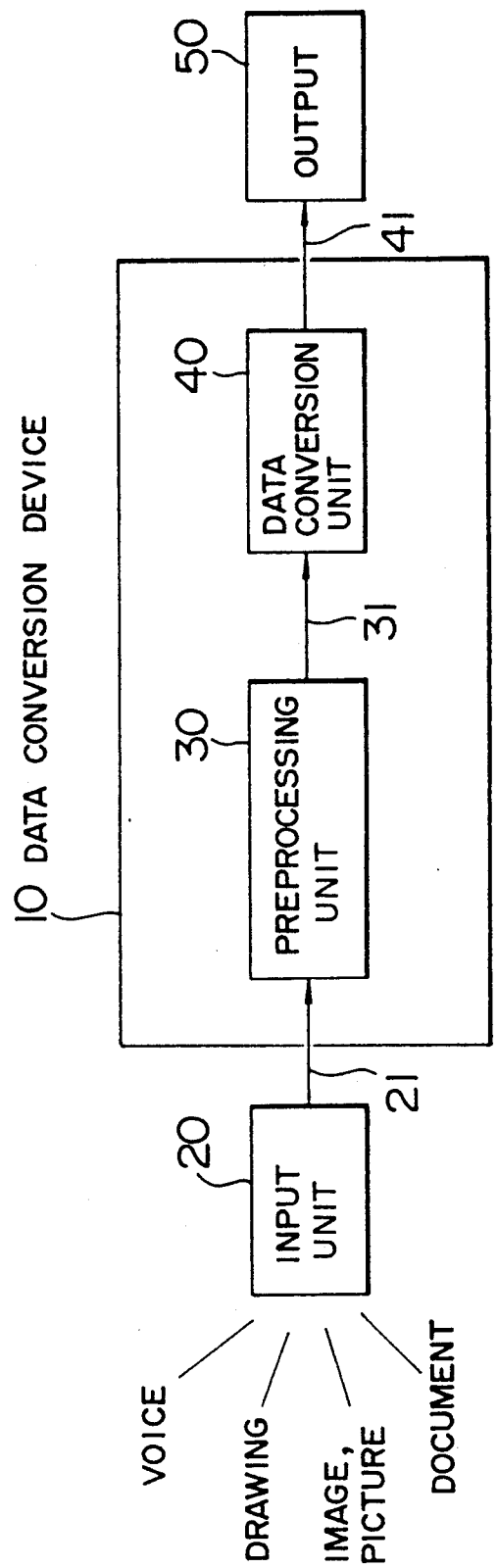

DATA FILTERING METHOD

BACKGROUND OF THE INVENTION

The present invention generally relates to a data processing unit for converting waveform information or data of image data (e.g. drawings, documents, pictures, color pictures, medical images and so on) and other data to a data form capable of being processed on a computer and/or performing recognition of image data, reduction of noise, analysis of data and/or other processing to thereby allow these data to be processed by the computer. More particularly, the present invention is concerned with a method of filtering a large amount of data such as document data, image data, drawing data or the like used in OA, FA and other equipment.

According to the filtering techniques employed heretofore, an $(n \times m)$ size image or picture is cut out around a point or location to be processed by a filter having a size, for example, of $(n \times m)$. Another method involves dividing the $(n \times m)$ size filter into sub-filters having a size on the order of $(3 \times 3)$, wherein filtering is performed $(2 \times 2) \times (m-2)$ times. In either method mentioned above, the number of times the processing is executed for a whole image depends largely on the filter size values n and m. This sort of filtering procedure is discussed in Makoto Nagao "Digital Image Processing", Kindai Kagakusha Inc. of Japan, (1978), pp. 376-379.

The above-mentioned prior art filtering techniques intrinsically suffer from the problems mentioned below. In the filtering processing frequently required in the processing of drawings, documents, pictures or other images in offices, the filter size is in the range of $10 \times 10$ to $50 \times 50$. To meet this requirement, filtering with the filter size of $(3 \times 3)$ must be repeated $8 \times 8 \ (=64)$ to $48 \times 48 \ (=2304)$ times, which is practically impossible in many applications. To deal with this problem, a method is known by which the above is carried out by resorting to the use of a dedicated device. According to this method, some images such as TV images can be processed by using a filter of a size in the range of $(3 \times 3)$ to $(5 \times 5)$ and, if necessary, by repeating filtering only a small number of times. However, in the field of OA equipment and others, there exists a need for a filter of a greater size as well as a dedicated device for attaining a high speed operation, which of course implies significant increase in expenditures. Under the circumstances, difficulty is encountered in implementing such image processing system in commercially acceptable products.

It must further be pointed out that the prior art image processing method relies on the arithmetic operation on a pixel-by-pixel basis. To this end, an image data buffer of extremely large capacity is required for storing the image data of the amount corresponding to the number of pixels (picture elements) to be processed. Furthermore, at the present state of the art of facsimile and optical disc systems, storage of data in the form of compressed code is prevalent. In this connection scheme, according to the prior art method, the compressed code has to be developed once to the image data before being processed, thus presenting a problem that the merits of recording in the form of compressed data (i.e. reduction in the data amount) can not be taken advantage of. Additionally, because of a large amount of drawing and document data to be handled by the systems installed in offices, workshops and hospitals, the data are ordinarily stored in magnetic discs, floppy discs, optical discs and others. In such case, a great deal of time is required in the data transfer due to the necessity of accessing a great number of times the image data stored in these storage devices.

SUMMARY OF THE INVENTION

It is contemplated with the present invention to provide an image data filtering method which can assure a high-speed filtering operation by solving the problems of the prior art described above and in which no dedicated apparatus is required.

Accordingly, a first object of the present invention is to provide an image data filtering method according to which the filtering processing can be accomplished within a reduced time independent of the filtering mask size as employed.

A second object of the present invention is to provide algorithms which can be realized by a general purpose computer system without resorting to the use of any special dedicated device.

A third object of the present invention is to provide a filtering method capable of directly filtering the compressed image data without need for developing the compressed image to the pixel (picture element) data.

For accomplishing the first and second objects mentioned above, it is proposed according to an aspect of the present invention to utilize effectively the interim (intermediate) results derived in the course of operation. More specifically, representing filter length by n, the operation for determining $(n+1)$ outputs (results) from 2n input data rows is completed by performing the operation $3(n-1)$ times, which is defined as one cycle and repeated for the whole image. To this end, one result is first derived from the n input data rows. According to a first important feature of the present invention, the interim result thus obtained is utilized effectively. More specifically, binomial operation is performed on the n-th input data and the $(n-1)$-th input data, the result of the operation being temporarily stored. Again, binomial operation is performed on the result stored temporarily and the $(n-2)$-th input data, the result of which is also stored temporarily. This operation is repeated sequentially $(n-1)$ times to finally obtain one result, which is the very result of the first filtering cycle. It will be noted that the interim or intermediate results derived until the final result is obtained are utilized effectively $(n-2)$ times.

Subsequently, the $(n+1)$-th result is determined through the procedure mentioned below. The binomial operation is performed on two input data, i.e. the $(n+1)$-th and $(n+2)$-th input data, the result of which is stored, whereupon a binomial operation is performed on the result being stored and the $(n+3)$-th input data. By repeating this operation sequentially, $(n-2)$ interim results and the $(n+1)$-th result can be determined. The number of times the binomial operation is performed in this procedure is $(n-1)$.

At this time point, there have been obtained $2(n-2)$ interim results of the operation. As will be more clear from description of exemplary embodiments of the invention, $2(n-2)$ interim results are added with n-th and $(n+1)$-th inputs, whereby $2(n-1)$ data in total are combined each in a pair. Thus, through $(n-1)$ operation, $(n-1)$ results (i.e. second to the n-th results) are obtained. As will be appreciated, according to the procedure described above, the first result is determined through (n−1) operations, the last result is determined through (n−1) operations, and (n−1) interim results are determined through (n−1) operations. Accordingly, through 3(n−1) operations in total, (n+1) outputs (results) can be determined. In practical application, the processings mentioned above are more or less interchanged with a view to decreasing the number of times a memory is accessed. In any case, according to the present invention, the principle that in the expansion filtering, shrinking filtering, maximum filtering and the minimum filtering, the sequence or order of arguments of these filtering functions may be interchanged upon execution is effectively made use of. By way of example, the method according to the invention is effective when the value of a filtering function $f(x_1, x_2, \ldots, x_n)$ remains unchanged even when the arguments $x_1, x_2, \ldots, x_n$ are interchanged, as exemplified by $Max(A, B) = Max(B, A)$. Heretofore, this concept has not been known. Accordingly, the present invention resides in discovery of this concept or principle and utilization thereof.

Further, according to a second aspect of the present invention, the procedure described above can be executed inexpensively at an increased speed by adopting a novel pipeline buffer system, wherein the interim results of operations are efficiently stored in work memories each of a small capacity, while reducing useless data transfer.

For accomplishing the third object mentioned above, black-to-white/white-to-black change addresses (coordinate values) on one line are extracted directly from the compressed image data according to a third aspect of the present invention, wherein the filtering procedure is executed on only the extracted value. In other words, in contrast to the hitherto known method in which operation is performed on a pixel-by-pixel basis, the present invention teaches that the operation be performed on the coordinate values of the white-to-black/black-to-white changing or transition points. By using the coordinate values of the adjacent image changing points on one line and the filter size n, the result of the filtering is determined. The results are also represented by a row of coordinate values of the image changing or transition points. Accordingly, an inter-line filtering is performed on both the coordinate row mentioned above and the overlying or underlying row. In this operation, there is no need for developing the image to the pixels.

In summary, according to the first aspect of the present invention, determination of (n+1) results on the basis of 2n input data rows with a mask size of n requires only 3(n−1) binomial operation. In other words, for one output (result), $3(n-1)/(n+1)$ operations is sufficient, which is at most three even when n is increased endlessly. This can be explained by the fact that the number of times the operation is performed is essentially independent of the filter size n and is three (3) at the most. Thus, a large scale filtering with the filter size n of a large value can be accomplished at a high speed.

According to the second aspect of the present invention, there is basically required no more than the work memory for storing the input data. Of course, in conjunction with the first aspect of the invention, it is necessary to store the interim result. However, by control such that the interim results are sequentially stored in the memory for the input data at the location which is no longer used for the operation, no additional memory is required, whereby expenditure can be correspondingly reduced. Further, the control is simple and can be performed satisfactorily by using a general purpose system. In other words, the image processing method according to the invention can be carried out adequately with a general purpose arithmetic circuit or through programmed processing by a general purpose computer.

According to a third aspect of the present invention mentioned above, the time required for processing the whole image is not proportional to the number of the pixels constituting the image to be processed but is in proportion to the total number of the image transition points on the line basis. In general, in the documents and drawings, the blank area occupies a major proportion of the space because figures, characters and others are usually drawn or written with a pinpoint pen or pencil. Consequently, most of the pixels constitute a string of blank areas, resulting in that the number of transitions in an image is far smaller than that of the individual pixels.

Usually, the number of transitions or changes in an image is about 1/50 of the number of the pixels. Further, comparison of the coordinate values can be readily realized through simple arithmetic operation. Consequently, no significant difference is found between the processing for one image transition or change point and the processing for one pixel. Thus, it will be appreciated that significant speed-up of the processing can be accomplished according to the third aspect of the present invention.

The invention can be applied to the processing of k-dimensional data as well as one- and two-dimentional data.

BRIEF DESCRIPTION OF THE DRAWINGS

FIG. 1A shows schematically a general arrangement of a system for carrying out an image data filtering method according to an exemplary embodiment of the present invention;

FIG. 1C is a view for illustrating schematically another example of the image data filtering procedure to which teaching of the present invention can be applied;

FIG. 3 is a view for illustrating an image data filtering method according to an embodiment of the present invention as applied to the processing of one-dimensional data;

FIG. 4B shows in detail processings involved in the image data filtering method carried out by the system shown in FIG. 4A;

FIG. 12A shows schematically a structure of still another system for carrying out the filtering method according to a further embodiment of the invention;

DESCRIPTION OF THE PREFERRED EMBODIMENTS

Figure 1B:
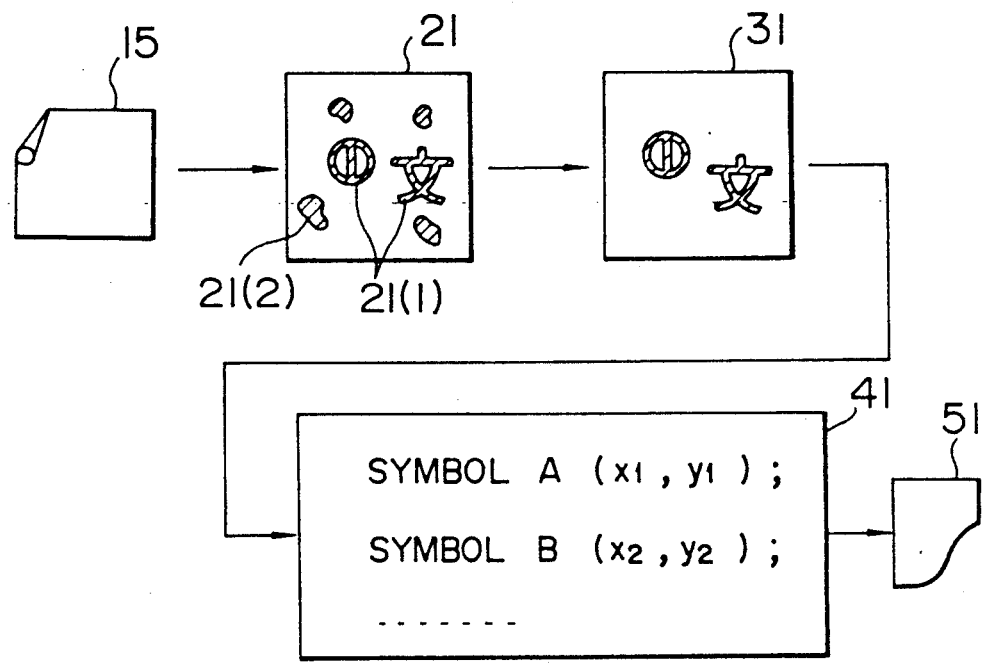
FIG. 1B is a view for illustrating schematically a process of the image data filtering procedure to which the present invention can be applied.

In the following, the present invention will be described in detail in conjunction with preferred and exemplary embodiments thereof by reference to the drawings.

FIG. 1A shows schematically a general arrangement of a data conversion system according to an embodiment of the invention. In the figure, a reference numeral 10 generally denotes a data conversion device, 20 denotes an input unit, and 50 denotes an output unit. Input data 21 inputted through the input unit 20 are processed by the data conversion device 10 to be outputted as resultant data 41. The data conversion device 10 is composed of a preprocessing unit or preprocessor 30 and a data conversion unit 40.

The data input unit 20 may be constituted by an image sensor in case the drawing data is the objective for the processing. When satellite image data is to be processed, the input unit is constituted by a satellite signal receiving apparatus. In the case of industrial visualization systems and robots, the input unit may be a television camera.

FIG. 1B is a view for illustrating application of the present invention to the processing of drawing data, by way of a typical example of the data processing. In this figure, reference numeral 15 denotes a drawing subjected to processing and 21 denotes input data inputted through the input unit 20. In the case of the instant example, the input data contains noise 21(2) in addition to symbol data (figure data) designated by a reference numeral 21(1). A reference numeral 31 indicates the data resulting from the preprocessing. It will be seen that only the symbol data or figure data remain in the resultant data 31, which then undergoes data conversion in the data conversion unit 40, as the result of which there can be obtained the resultant data (also referred to as result data) 41. In the case of the illustrated example, the data 41 resulting from the data conversion are shown as containing the types of the symbols and the positions thereof on the input drawing. A block 51 represents the output of the result data 41.

FIG. 1C is a view showing, by way of an example, an application of the present invention to the data conversion for efficient and intelligent storage (memorization) of documents. In this figure, a reference numeral 15(2) denotes documents and 21(2) denotes image data of the document inputted through the input unit. The image data may contain data of the title, text, pictures and other elements. The data of the title, the text and the picture separated from one another as the result of filtering according to a method taught by the present invention are designated by 31(2), 31(3) and 31(4), respectively. The results of the efficient conversion of the title, text and the picture are designated by 41(2), 41(3) and 41(4), respectively. These resultant data are assembled together to constitute the whole result data as represented by a file 50. The filtering operation adopted in this example will be mentioned below. For the convenience of description, the maximum horizontal and vertical sizes of constituent characters of the title are represented by $n_x$ and $n_y$, respectively, with the horizontal intercharacter space being represented by $n_z$. First, representing the input data by $D(i, j)$ (where characters assume large values) with the result data by $R'(i, j)$, the maximum filtering is performed with the horizontal size $(n_x+n_z)$ and the vertical size $n_y$. Namely, $$R'(i, j) = Max\{(D(i+\xi, j+\eta))\}$$

where $$\left(\frac{n_x + n_z}{2}\right) - (n_x + n_z) < \xi \leq \left(\frac{n_x + n_z}{2}\right),$$

and $$\left(\frac{n_y}{2}\right) - n_y < \eta \leq \left(\frac{n_y}{2}\right)$$

This maximum filtering operation is adopted in the filtering method according to the present invention such that one point can be processed by a maximum of three filtering processings. When the input image is a binary image, i.e. $D(i, j) = "1"$ or "0", the result data $R'(i, j)$ represents a figure in which picture elements or pixels constituting a character are circumjacently expanded horizontally by $(n_x+n_z)/2$ to the left and right and vertically by $n_z/2$ upwardly and downwardly, respectively. When the characters which conform to the associated standards for the title character are juxtaposed horizontally, a row of several characters constitutes a string figure of interconnected characters. By extracting this figure, a candidate for the region to be occupied by the title can be extracted. The figure obtained by hollowing out the original input image from this region, namely, $$R'(i, j). \text{ AND. } D(i, j)$$

represents the title image 31(3). In practical application, this filtering operation is repeated with the filter or mask size being changed for the purpose of enhancing the accuracy of the regional image. It should however be understood that the filtering processing can be accomplished at a higher speed according to the present invention for extracting the title image in an arbitrary manner.

The picture and the text can be extracted through similar processing.

Figure 1D:
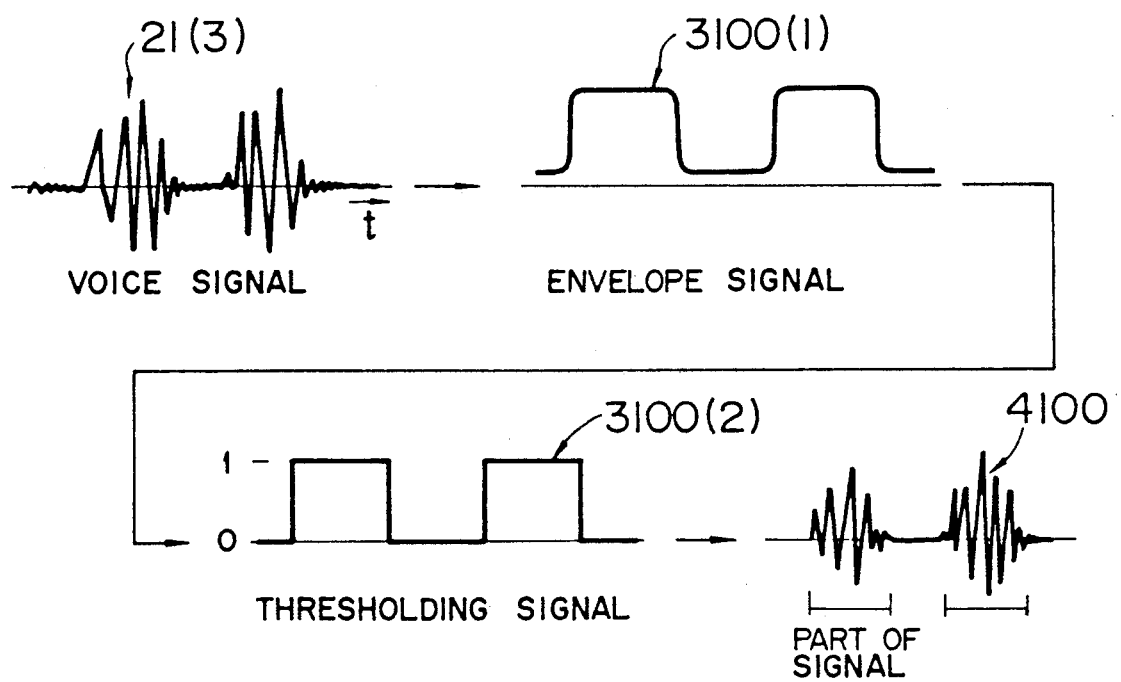
FIG. 1D is a view for illustrating still another example of the data filtering procedure to which the teaching of the present invention can also be applied.

An example of high-speed processing of waveform signals such as a sound signal is illustrated in FIG. 1D. In this figure, a reference numeral 21(3) denotes an input signal, and 3100(1) denotes an envelope signal resulting from the maximum filtering of the input signal. By thresholding this envelope signal, there can be derived gate signals 3100(2), each having logic level "1" only at the parts of the signal. By combining the gate signal with the sound signal, it is possible to extract only parts of the sound signal. The result is shown at 4100. The envelope signal 3100(1) can be derived at a remarkably high speed through data conversion by making use of the preprocessing unit inclusive of the filtering units according to the present invention.

Figure 2A:
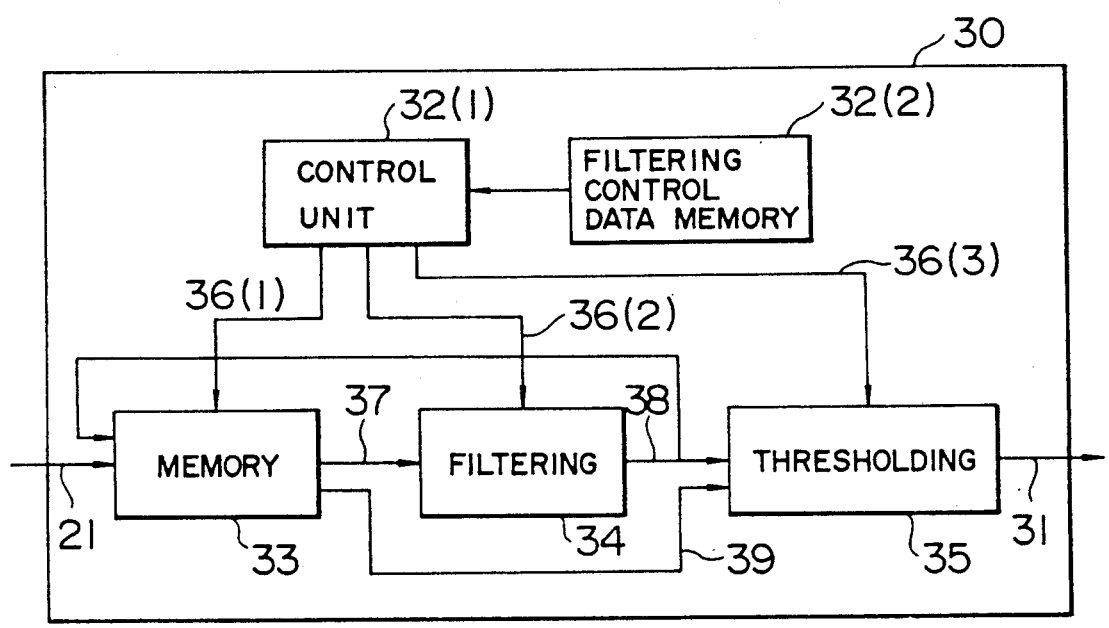
FIG. 2A shows schematically a structure of the preprocessor employed in the system shown in FIG. 1A.

FIG. 2A shows by way of example, a structural, configuration of the preprocessing unit 30. The input data 21 is first stored in a memory unit 33. Subsequently, the data 37 read out from the memory unit 33 is filtered by a filtering circuit 34, the result 38 of which is supplied again to the memory 33 or to a succeeding thresholding circuit 35. Ordinarily, the filtering unit 34 is used a number of times. It should be noted that a corresponding number of filtering units or circuits may be connected in cascade to the similar effect without departing from the spirit of the present invention. In the case of the illustrated embodiment, it is assumed that one and the same filtering unit or circuit 34 is used repeatedly in association with the memory 33. Control units 32(1) and 32(2) serve to control the memory unit 33, the filtering unit 34 and the thresholding circuit 35. The control unit 32(2) is utilized for storing various parameters for the filtering.

The reference numerals 36(1), 36(2) and 36(3) denote control signals, respectively. More specifically, 36(1) designates a group of various strobe signals such as address signal, read/write control signals and the like, 36(2) designates a group of signals representative of types of operations, filter parameters, filter size and the like, and 36(3) designates a signal commanding the threshold value to be set in the thresholding circuit. Parenthetically, the thresholding function may alternatively be incorporated in the filtering unit. In such case, the thresholding circuit 35 can of course be spared. Further, it goes without saying that in the case of preprocessing which requires no thresholding function, thresholding circuit 35 can be omitted. Additionally, there may be such application where the input data can be directly supplied to the filtering unit. In that case, the memory unit 33 may naturally be spared. It should however be noted that the omission of the thresholding circuit and/or the memory unit mentioned above does not affect the essence or spirit of the present invention.

Figure 2B:
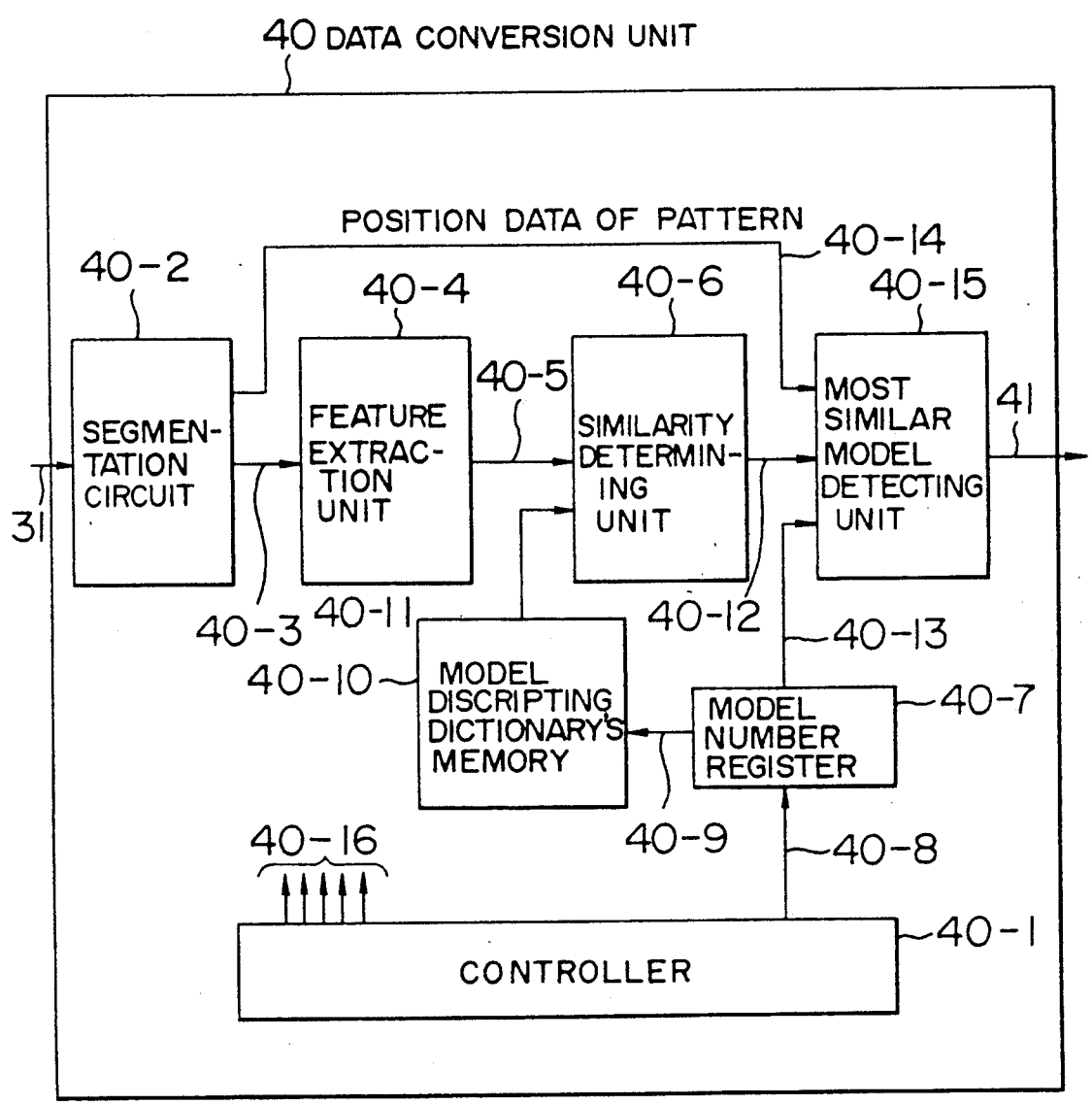
FIG. 2B shows schematically a structure of the data conversion unit employed in the system shown in FIG. 1A.
Figure 2C:
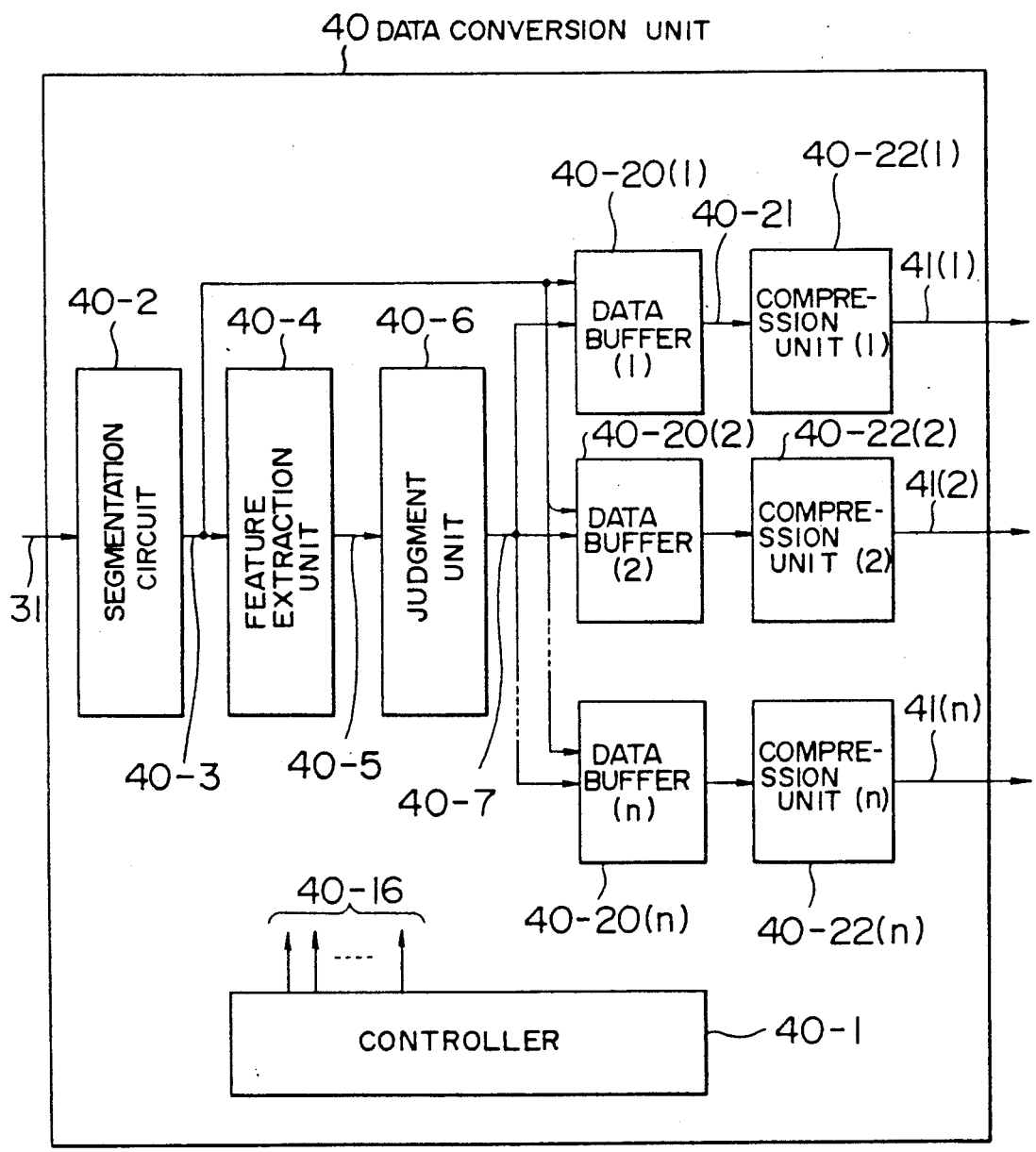
FIG. 2C is a view showing a version of the data conversion unit.

FIG. 2B and FIG. 2C show in some detail an internal structure of the data conversion unit 40 shown in FIG. 1A.

More specifically, FIG. 2B shows the structural configuration of the data conversion unit 40 which is adapted for use in recognizing such figures as shown, for example, in FIG. 1B in the course of the processing for data conversion. The output 31 from the preprocessing unit is at first separated into a plurality of figure segments by a segmentation circuit 40-2. (Of course, the invention is not restricted to the figure but applicable to signal waveforms in more general terms. The following description will however be made by utilizing the figures as an example.) The separate figure data 40-3 resulting from the segmentation processing are supplied to a feature extraction unit 40-4 by means of which feature quantities are extracted. The feature quantities may include the area, circumferential length, the width and the height of the figure of concern. The feature data 40-5 resulting from the analytical measurement by the feature extraction unit 40-4 are collated with those of a model in a succeeding similarity determining unit 40-6. The model features are stored in a model dispatching memory 40-10. Since a plurality of models are usually made available, the model number designating the model to be used for the collation is issued by controller 40-1. The signal indicating the model number is denoted by a reference numeral 40-8 while the means for storing the model number is constituted by a model number register 40-7. With the aid of the output 40-9 of the model number register 40-7, a model describing dictionary memory 40-10 is addressed, whereby the feature quantities of the addressed model are supplied to the similarity measuring or determining unit 40-6 by way of a signal line 40-11. The output of the similarity measuring or determining unit 40-6 is supplied to the succeeding stage constituted by a most similar model detecting unit 40-15, where the model exhibiting the greatest similarity is selected. The identification number of the selected model is supplied to the most similar model detecting circuit 40-15. On the other hand, the position data of the figure of concern are determined in terms of positional information (e.g., gravity, centroid, etc.) which are then supplied to the most similar model detecting circuit 40-15 over signal line 40-14. The synthesized result of these figure data and the position data is outputted in the form of a signal 41 from the most similar model detecting circuit 40. Reference numeral 40-16 represents a set of clock signal, select signal, strobe signal and the like utilized for controlling the constituent elements of the data conversion unit 40.

FIG. 2C shows a structural configuration of the data conversion unit destined for use in the conversion of document data, as illustrated in FIG. 1C. As in the case of the arrangement described above in conjunction with FIG. 2B, the resultant data 31 outputted from the preprocessing unit 30 is separated into the figure data by the segmentation circuit 40-2. The result data 40-3 outputted from the segmentation circuit 40-2 then undergoes feature extraction processing in the feature extraction unit 40-4. By making use of the result derived through the feature extraction processing, the figures or figure groups are classified into categories (such as, for example, title character, text, graphic, caption, photograph, color photograph and the like). The classification may be performed by resorting to the collation with models as in the case of the processing already described in conjunction with FIG. 2B or by resorting to the use of a programmed processing unit or computer. The output data 40-3 of the segmentation unit 40-2 are stored in data buffers 40-20(l) to 40-20(n) provided separately for every category. In this way, the output signals 40-7 produced by a judgment circuit 40-6 are used as select signals for determining selectively the data buffers which are to store the outputs of the segmentation circuit 40-4 in accordance with the categories. The outputs 40-21 of the data buffers 40-20 undergo data compressions which are appropriate for the categories to which the output data belong through compression unit 40-22, whereby outputs 41 are produced. Although these outputs are shown as produced on a the category basis, they can be produced in the form of a single signal row (a string of signals) in which the individual outputs are combined together. In such case, each signal row may be in the form of a string including a category identification code and the compressed code in this order.

Now, the description will be turned to the structural arrangement of the filtering unit 34 according to the present invention. FIG. 3 shows an example of the maximum filtering performed for a one-dimensional data array or row with a filter size of "5". In this figure, a reference numeral 100 denotes an input data row, and 101 denotes individual input data names (names of arguments). In the illustrated case, it is assumed that the filtering is performed for ten successive input data $A_1$, $A_2$, ..., $A_{10}$. The contents of the input data are designated by numerical values inserted in the input data row 100, as designated by a reference numeral 102. In the case of the instant example, the input data assume the following values:

$$A_1=8, A_2=5, A_3=3, A_4=2, A_5=0, A_6=2, A_7=6, A_8=0, A_9=9, \text{ and } A_{10}=1 \quad (1)$$

For this input data row, the result data row derived through the filtering operation is determined. A reference numeral 200 designates the result data row, a numeral 201 designates the argument names of the result data row and a reference numeral 202 designates the contents thereof. In view of the maximum filtering with the filter size of "5", the result data $B_1$ to $B_6$ can be described by the following expressions:

$$B_1 = Max(A_1, A_2, \ldots, A_5) \quad (2.1)$$
$$B_2 = Max(A_2, A_3, \ldots A_6) \quad (2.2)$$
$$\vdots$$
$$B_6 = Max(A_6, A_7, \ldots, A_{10}) \quad (2.6)$$

The nodes shown by solid points or dots in black at 300-1, 300-2, ..., 300-12 represent binomial operations, respectively. In the case of the instant example, the binomial operation is a maximum operation for determining the maximum value of two numbers. Of arrowed lines connected to the node 300-1, the incoming lines 301 and 302 represent the inputs for the binomial operation with the outgoing arrowed line representing the result thereof. In the case of the illustrated example, data values $A_4$ and $A_5$ are inputted as the inputs 301 and 302, respectively, for the operation at the node 300-1, whereby the result or output value represented by Max($A_4$, $A_5$) is determined, and the result value in turn is utilized as the input for the operation at the node 300-2 and as the input for the operation at the node 300-9. The numerals indicated in parentheses below the node point in black (such as, for example, "304" under the node 300-1) represent the actual value of the result of the operation (e.g. in the case of "304", Max($A_4$, $A_5$) = Max(2, 0) = 2). The meanings of the reference symbols and numerals in FIG. 3 will be understood. The description will now be directed to the operation procedure in detail.

When the operation result or output row 200 is to be determined from the input data row 100, the input data row is divided into segments including ten input data corresponding to two times the filter size of five (i.e. $2\times5$), whereby six (5+1) results are determined. By representing the ten inputs by $A_1$, $A_2$, ..., $A_{10}$, the binomial operation is performed on the fifth input $A_5$ and the fourth input $A_4$. On the assumption that $A_4=2$ and $A_5=0$, the input 301 to the operation at the node 300-1 is "2" with the other input 302 being zero (0). Accordingly, operation at the node 300-1 is given by $$Max(A_4, A_5) = Max(2, 0) = 2 \quad (3.1)$$

Thus, the value of the result data 304 is "2" as indicated by a symbol (2) inserted underneath the node 300-1. Subsequently, binomial operation is performed on the result data having the value "2" and the input data $A_3$ at the node 300-2. Namely, $$Max(3, 2) = 3 \quad (3.2)$$

The above operation is equivalent to the operation of Max($A_3$, $A_4$, $A_5$).

In a similar manner, the following operations are successively performed.

Operation 300-3: Max($A_2$, $A_3$, $A_4$, $A_5$) = Max($A_2$, 3) = Max(5, 3) = 5 \quad (3.3)

Operation 300-4: Max($A_1$, 5) = Max(8, 5) = 8 \quad (3.4)

The result of the final operation at the node 300-4 is the value of $B_1$ which is thus given by $$B_1 = Max(A_1, A_2, \ldots, A_5) = 8 \quad (2.1)$$

Next, operation is performed at node 300-5 for the result value of the operation 300-3 and the input $A_6$. As described before in conjunction with expression (3.3), one of the inputs to this operation 300-5 is the maximum value of the four input values $A_2$, $A_3$, $A_4$ and $A_5$. Accordingly, operation 300-3 is to determine the maximum value of the five inputs $A_2$, $A_3$, $A_4$, $A_5$ and $A_6$. In this way, the result $B_2$ is determined.

Subsequently, operation 300-6 is performed by using two inputs $A_6$ and $A_7$. Namely, at operation 300-6: Max($A_6$, $A_7$) = Max(2, 6) = 6 \quad (3.6)

Similarly,

Operation 300-7: Max(Max($A_3$, $A_4$, $A_5$), Max($A_6$, $A_7$)) = Max(3, 6) = 6 = $B_3$ \quad (3.7)

Operation 300-8: Max(Max($A_6$, $A_7$), $A_8$) Max(6, 0) = 6 \quad (3.8)

Operation 300-9: Max(Max($A_4$, $A_5$), Max($A_6$, $A_7$, $A_8$)) = Max(2, 6) = 6 = $B_4$ \quad (3.9)

Operation 300-10: Max(Max($A_6$, $A_7$, $A_8$), $A_9$) \quad (3.10)

Operation 300-11: Max($A_5$, Max($A_6$, $A_7$, $A_8$, $A_9$)) = 9 = $B_5$ \quad (3.11)

Operation 300-12: Max(Max($A_6$, $A_7$, $A_8$, $A_9$), $A_{10}$) = 9 = $B_6$ \quad (3.12)

The total number of the operations performed for obtaining the six results $B_1, B_2, \ldots, B_6$ is "12" which is a value equal to three times "4" resulting from subtraction of "1" from the filter size of "5". Further, it will be understood that two binomial operations are sufficient for deriving one result of operation. This procedure is carried out for the whole input row.

Thus, generally when the filter size is represented by n, determination of the result $B_1$ in accordance with $$B_1 = Max(A_1, A_2, \ldots, A_n)$$

can be realized by (n=1) operations performed first for $A_n$ and $A_{n-1}$, next for the result of this operation and $A_{n-2}$, and so forth, respectively.

For determination of the result $B_{n+1} (= Max(A_{n+1}, \ldots, A_{2n})$, the binomial operations are performed (n−1) times in the reverse direction similarly to the determination of the result $B_1$. Upon the deriving of (n−1) results $B_2, B_3, \ldots$ and $B_n$, the binomial operation may be performed once for each of the results by making use of the interim results obtained in the determination of $B_1$ and $B_{n+1}$. In this way, through the maximum filtering with a filter size of n, the results in the number of (n+1) can be derived by 3(n−1) binomial operations. Thus, for one binomial operation $$\frac{3(n-1)}{n+1} \tag{4}$$

As will be seen, even when n→∞, one output (result) can be determined through three operations at the most. When compared with the prior art filtering technique in which the operations are necessarily a number of times proportional to the filter size, the operation procedure according to the present invention makes it possible to realize very high speed filtering in which the number of the involved operations is substantially independent of the filter size.

Figure 4A:
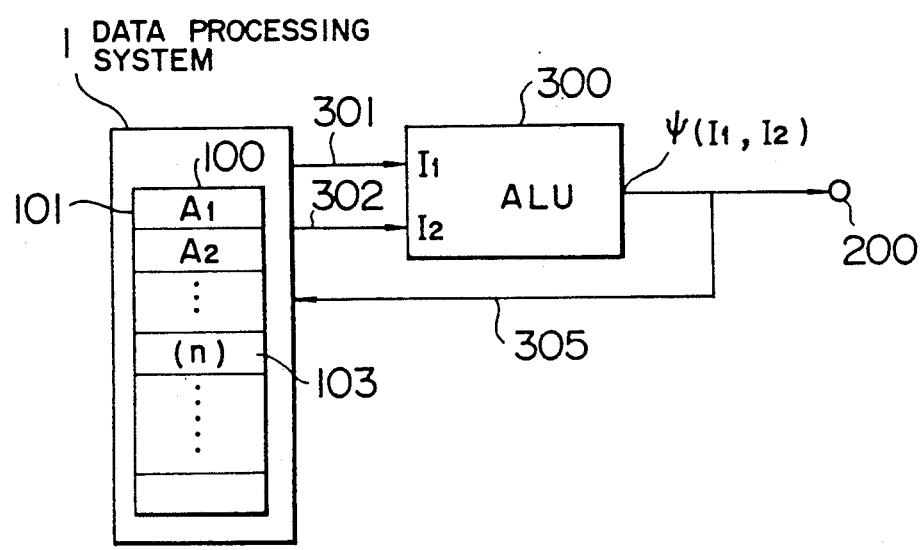
FIG. 4A shows a major portion of the system for carrying out the filtering method according to another embodiment of the present invention.

FIGS. 4A and 4B show another embodiment of the present invention. The method or procedure described below is applicable not only to the maximum filtering but also to a wide variety of filterings for minimum values, median values, medium values, total sums, means values, logical sums and logical products of binary data, counts "1" (or "0") in which the arguments referenced to in the filtering operation have interchangeability. In FIG. 4A, there is shown a structural configuration of the filtering means while the filtering procedure is shown in FIG. 4B. The generalized expression employed in this operation can be written as follows:

$$B_i = \phi(i, i+n-1) \equiv \phi(d_i, d_{i+1}, \ldots, d_{i+n-1})$$

From the following description of the instant exemplary embodiment, it will be demonstrated that the memory unit can be utilized efficiently. First, description will be directed to the structure of the filtering unit by reference to FIG. 4A. A reference numeral 1 denotes a data processing system including a control unit and a storage or memory. (Although it is assumed for the convenience of elucidation that the arithmetic unit for performing the filtering operation is considered separately from the data processing unit, the former may of course be incorporated in the data processing unit without affecting the overall effect.) A reference numeral 100 denotes a memory device which may be regarded as corresponding to the input memory row shown in FIG. 3. A reference numeral 101 designates memory addresses. A numeral 300 denotes an arithmetic logic unit having inputs 301 and 302. Of the outputs from the arithmetic logic unit 300, those representative of intermediate or interim results are returned to the memory. The final result of the filtering operation is designated by a reference numeral 200. (When the result of the filtering is to be again processed and/or stored in the data processing system, the result or output of the arithmetic logic operation is returned to the system by way of a route denoted by 305.)

The operation of the arithmetic logic unit (ALU) 300 is expressed by $$\phi(I_1, I_2) \tag{5}$$

where $I_1$ and $I_2$ represent input operands, and $\phi$ represents the operation of such type in which the operands $I_1$ and $I_2$ are mutually interchangeable. Assuming that the objectives to be processed are images, figures or the like, typical values are those mentioned below Max: maximum values of $I_1$ and $I_2$,
Min: minimum values of $I_1$ and $I_2$,
Sumup: sum of $I_1$ and $I_2$ (finally, mean value, dispersion, area and other can be determined),
AND: logical product of $I_1$ and $I_2$ (used in shrinking the figure), and
OR: logical sum of $I_1$ and $I_2$ (used in expanding the figure).

Next, a generalized form of the arithmetic expression will be considered with the aid of the function $\phi$. The arguments of $\phi$ have interchangeability. In other words, $$\phi(I_1, I_2) = \phi(I_2, I_1) \tag{6.1}$$

When the processing is performed by using repeatedly the function $\phi$, each of the processings mentioned above does not depend on the order of $\phi$ but only on the arguments. Namely, in a generalized form, $$\phi(A, \phi(B, C)) = \phi(\phi(A, B), C) \tag{6.2}$$

From the expression (6.1) and (6.2), $\phi$ can be expanded to a multinomial function from the binomial function. Since it is assumed now that the filter is to process a row of the successive input data 101, it is desirable to derive functions which can clarify the first and last data of the input data row, when the function $\phi$ is used successively. Under the circumstance, $\phi$ is defined as follows:

$$\phi(i, j) \equiv \phi(A_i, A_{i+1}, \ldots, A_j) \tag{6.3}$$

where $$i \leq j, \ \phi(i, i) \equiv A_i \tag{6.4}$$

Further, for a special case, $\phi_i$ is defined as follows:

$$\phi_i \equiv \phi(i, i+n-1) \tag{6.5}$$

where n represents the filter size, and $\phi_i$ represents the final result of the filtering.

Now, operation of the system shown in FIG. 4A will be described by reference to FIG. 4B in which the operand $I_1$ represents the input 301 to the arithmetic logical unit or ALU while the operand $I_2$ represents the input 302 to that ALU.

As will be obvious from the foregoing description, the input operands $I_1$, $I_2$ may be interchanged without departing from the teachings of the present invention. Time points t correspond to the steps in the arithmetic operation, respectively. In the columns labeled "Output Of ALU Operation 305" and "Result Of Filtering 200" in FIG. 4B, there are shown concrete values at the locations designated by same reference numerals in FIG. 4A. The address entered in the column labeled "Output Of ALU Operation 305" in FIG. 4B implies that the result of ALU operation is again stored in one cell of the memory 100 shown in FIG. 4A. In other words, the address is that of the memory cell.

At first, when t=1, data $A_{n-1}$ stored in the memory 100 at the address (n−1) is inputted as the operand $I_1$ as indicated by 301 while the data stored at the address n is inputted as the operand $I_2$ as indicated by 302, whereupon the operation $\psi$ is executed by the ALU 300. The result of this operation ($A_{n-1}$, $A_n$), i.e. $\phi(n-1, n)$ is written at the address (n−1). The data $A_{n-1}$ at the address (n−1) is replaced by $\phi(n-1, n)$. Thus, it is unnecessary to use a new cell for storing the latter.

At a step or time point t (=2), the respective addresses of the operands $I_1$ and $I_2$ are decremented by 1 (one), respectively, the resultant contents thereof being inputted to the ALU 300. At that time point, there is stored at the address (n−1) the data $\phi(n-1, n)$ determined at the step t (=1). Accordingly, operation performed at t (=2) is as follows:

$$\phi(A_{n-2}, \phi(n-1, n)) \equiv \phi(A_{n-2}, \phi(A_{n-1}, A_n))$$
$$\equiv \phi(A_{n-2}, A_{n-1}, A_n)$$
$$\equiv \phi(n-2, n)$$

(from the expression 6.3)

After repeating this operations at steps t (=3, 4, ..., n−2), the contents in the memory 100 become as follows:

At address 2, $\phi(2, n)$
At address 3, $\phi(3, n)$
.
.
.
At address (n − 1), $\phi(n − 1, n)$, and
At the other address, original data remaining intact In the above-mentioned operation procedure, since the contents of the operand $I_2$ at the steps t (=2) to t (=n−2) represents the results determined at the immediately proceding steps, respectively, it is possible to directly utilize the outputs of the ALU 300 as the operand $I_2$ by incorporating a corresponding register in the ALU.

At a step t (=n−1), the operand $I_1$ is placed with $A_1$ at the address 1 with the operand $I_2$ being placed with $\phi(2, n)$ at the address 2 to perform the operation expressed as follows:

$$\phi(A_1, \phi(2, n)) = \phi(1, n) \equiv \phi_1 \quad (6.6)$$

At this stage, one result has been determined which may be utilized as the output 200 of the system shown in FIG. 4A. Parenthetically, when this result is stored again in the memory 100 to be utilized in the data processing system 100, it may be stored at the address 1 or any other address so far as the original data is not thereby destroyed.

At a step t (=n), operation is performed on $\phi(2, n)$ stored at the address 2 and the data $A_{n+2}$ stored at the address (n+1). Namely, $$\phi(\phi(2, n), (A_{n+1})) = \phi(2, n+1) \equiv \phi_2$$

This is the second result of the filtering. Similar to the case of $\phi_1$, it is not required to store $\phi_2$ at the address 2, since $\phi(2, n)$ stored at the address 2 is not utilized in the succeeding operation. Subsequently, at a step t (=n+1), operation is performed on the data $A_{n+1}$ stored at the address (n+1) and the data $A_{n+2}$ at the address (n+2):

$$\phi(A_{n+1}, A_{n+2}) \equiv \phi(n+1, n+2)$$

The result of this operation is stored at the address (n+1).

The operations at the two steps t (=n) and t (=n+1) described above are repeatedly executed until t=3n−4 and t=3n−3, respectively. The addresses employed for storing the data used as the operands in the course of this operation are shown in FIG. 4B. Basically, the operand $I_1$ is placed at every other of steps t (=n+2, n+4 and so forth) with $\phi(3, n)$, $\phi(4, n)$ and so forth which are stored at the addresses 3, 4 and so forth, respectively, while the operand $I_2$ is placed at every other of steps t (=n+3, n+5 and so forth) with the original input data $A_{n+3}$, $A_{n+4}$ and so forth, respectively. It will be noted that the address (n+1) is accessed at every step, involving a corresponding time consumption. This access may be spared by providing a register. In this scheme, it will further be noted that the value, for example, of $\phi(n+1, n+2)$ determined at the step t (=n+1) is used only at the two succeeding steps t (=n+2) and t (=n+3). In other words, the value of $\phi(n+1, n+2)$ is not required to be saved for the operation succeeding to the step t (=n+3). Accordingly, a register destined for temporary storage is sufficient for storing this value.

Through (2n−2) operations from the step t (=n) to the step t (=3n−3), there are determined n results of the filtering, which are:

$$\phi_2, \phi_3, \ldots, \phi_n, \phi_{n+1}$$

Except for the last result $\phi_{n+1}$, the other results are determined at every other step.

As will be understood from the above description, the number of the operation steps required for determining $\phi_1$ to $\phi_{n+1}$, i.e., the number of times the binomial function $\phi$ is used is:

$$3n-3$$

The number of times the binomial function $\phi$ is used for deriving one result of the filtering is:

$$\frac{3n-3}{n+1} \quad (7)$$

The procedure for determining the results succeeding to $\phi_{n+2}$, inclusive thereof, will now be described. It is assumed that the addresses for the operands $I_1$ and $I_2$ and the result of operation at the step t (=3n−2) correspond to those at the step t (=1) but added with (n+1), respectively. More specifically, at the step t (=3n−2), the operand $I_1$ is stored at the address 2n, the operand $I_2$ is stored at the address (2n+1) and the result of operation is stored at the address 2n. The procedure from the step t (=1) to the step t (=3n−2) is repeated starting from the step t (=3n−2) to the step t (=3n−2+(3n−3−1))=6n−6 according to the above-mentioned method of adding (n+1) to the addresses. There can be obtained the results in a number of (n+1), which are as follows:

$$\phi_{n+2}, \phi_{n+3}, \ldots, \phi_{2n+2}$$

The succeeding processing is executed in a similar manner. Any of the (n+1) results of filtering can be determined by 3(n−1) operations. Accordingly, throughout the whole processing, the average number of operations for determining one result is:

$$\frac{3(n-1)}{n+1}$$

This means that three operations at the most will be sufficient.

In connection with the filtering, when the filtering mask is represented by n, the valid results of the processing are given by The number of original data - n+1   (8)

In other words, because of shortage of the data to be processed in the periphery, the number of the results decreases by (n−1) relative to the number of the original data. In this case, the results may be determined with the decrease in the data being left as it is. However, there will arise inconveniency such that decreases in data must be taken into account when the data of concern is to again proceed. For excluding such inconveniency, the shortage may be compensated for by placing constants, or, alternatively, the (n−1) operations corresponding to the shortage may be executed based on the assumption that a row of (n−1) constants (whose values are determined in dependence on the boundary conditions) is present in precedence to or in succession to the original data row.

A method according to which the result of filtering of the input data row 1 is not outputted immediately but outputted starting from the (n/2)-th data row is conceivable. In this case, the results may be shifted after the processing or stored in the different memory areas starting from the (n/2)-th input data row, as with the case of the prior art.

Unless the number of the results of operation is an integer multiple of (n+1), the aforementioned procedure is repeated until the final result is obtained, and the remaining processing may be omitted. The number of operations required for the part exceeding an integral multiple of (n+1) can be calculated as follows:

Representing the number of filtering operations by (n+1)m+k   (9.1)

(where k=1, 2, ..., m)

then at k (=1), 3(n−1)m+(n−1)   (9.2), and at k (=2 to n), 3(n−1)m+(n−1)+2k−1   (9.3)

where (n−1) represents the number of steps required until $\phi_1$ has been determined. Thus, the number of operations for deriving one result is given by $$k = 1 \quad \frac{3(n-1)m + (n-1)}{(n+1)m + 1} \quad (9.4)$$

$$K = 2 \sim n \quad \frac{3(n-1)m + (n-1)2k - 1}{(n+1)m + k} \quad (9.5)$$

When m in the above expressions is of a large value, the number of operations according to the above expression (9.4) or (9.5) is about three (3). It is thus safe to say that the filtering can be achieved with a number of operations which is essentially independent of the filter size n.

Figure 5:
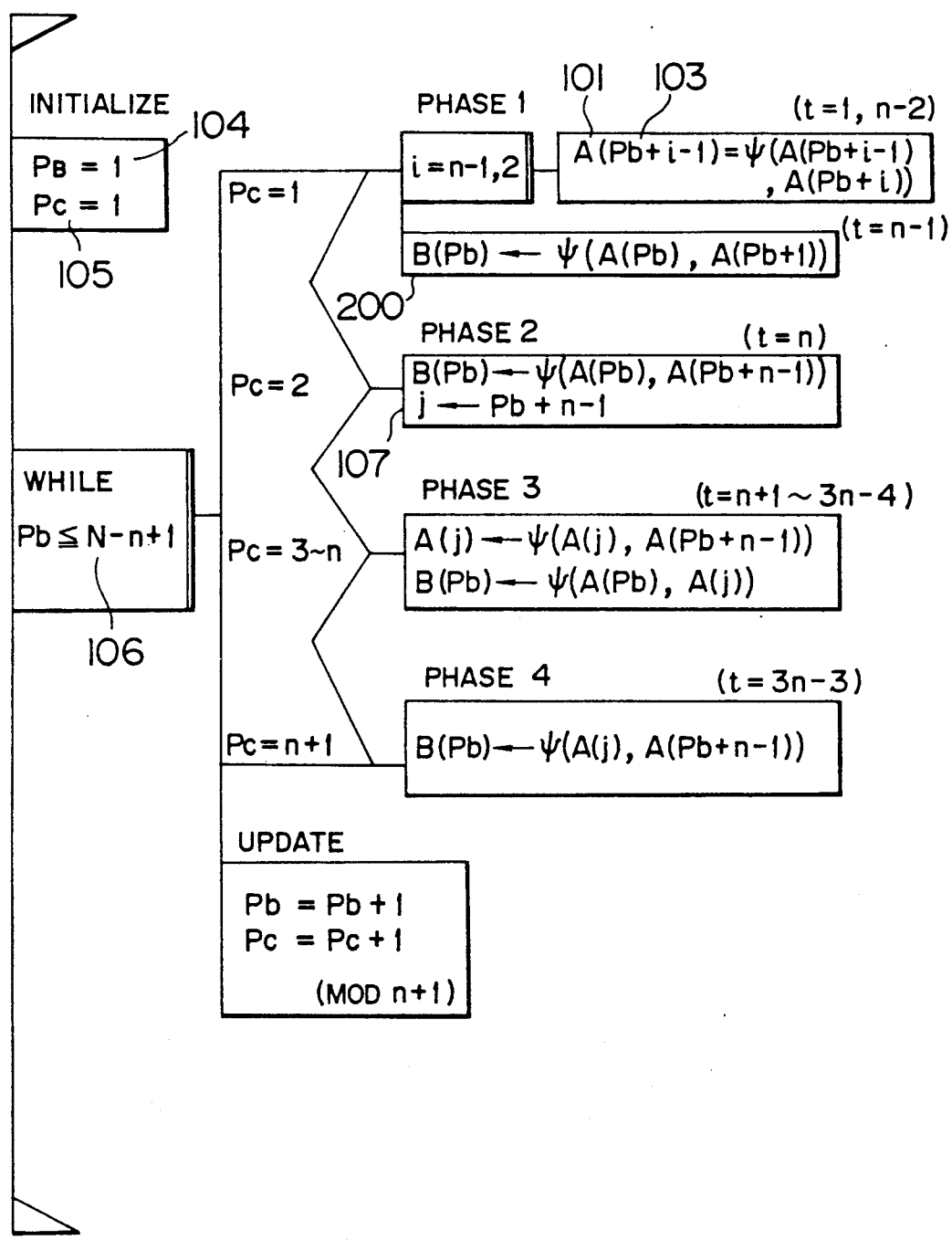
FIG. 5 shows procedure for executing the processing of FIG. 4 in a PAD chart.

FIG. 5 shows in the form of PAD implementation the procedure for executing the processings described above in conjunction with FIG. 4. Of the procedures shown in FIG. 4, those repeated a relatively large number of times are assembled into packets, respectively, whereby all the procedures are classified into four phases mentioned below for being programmed.

Phase 1: determination of $\phi_1$; from t (=1) to t (=n−1)

Phase 2: determination of $\phi_2$; step t (=n)

Phase 3: determination of $\phi_3$ to $\phi_n$; from t (=n+1) to t (=3n−4)

Phase 4: determination of $\phi_{n+1}$; step t (=3n−3)

In FIG. 5, a reference numeral 101 designates the input data, which is rewritten in the course of operation. A symbol Pb represents an output pointer which starts from "1". Reference numeral 105 denotes a work pointer represented by Pc which cyclically or repeatedly assumes a value in the range of 1 to (n+1). In other words, when one segment of the processing is defined as including the (n+1) results, the pointer Pc indicates which of the results in the segment of concern is being determined. Upon updating of the pointer Pc, calculation of mod (n+1) is performed. The total number of the input data is represented by N, as designated by a reference numeral 106. The pointer Pb may assume up to a value which is smaller than the total data number N by (n−1). Accordingly, so long as Pb ≦ N−(n−1)   (10)

the processing is executed. A symbol j in a block 107 represents a pointer for storing the address (n+1) used in each of the steps t (=n+1) to t (=3n−3) mentioned hereinbefore in conjunction with FIG. 4B. The value of this pointer j is updated upon every exit from the phase 2. The phase 2 takes place every time the pointer Pb assumes a value of "2". However, since the updating of the pointer Pc is realized by adding "+1" in accordance with mod (n+1), the value of the pointer j changes at every (n+1)-th step. Since the pointers Pc and Pb are simultaneously added with "+1", respectively, the pointer Pb is incremented by (n+1). In other words, it is apparent from the expression (10) that the pointer j is increased by (n+1).

As will be appreciated from the elucidation made by reference to FIG. 4, the content of A(j) stored by using the pointer j need not always be stored in the memory cell but may be stored in a register which can be referenced. By representing the content of A(j) by C, the phases 2, 3 and 4 illustrated in FIG. 5 can be simplified as follows:

Phase 2:

$\phi(Pb) \leftarrow \phi(A(Pb), A(Pb+n-1))$
$C \leftarrow A(Pb+n-1)$
(Rewriting of $j \leftarrow Pb+n-1$ to $d(j) \equiv C$)
Similarly, by rewriting $d(j)$ by C,
Phase 3:
$\phi(Pb) \leftarrow \phi(A(Pb), C)$
Phase 4:
$\phi(Pb) \leftarrow \phi(C, A(Pb+n-1))$ FIG. 5 shows implementation of the procedure shown in FIG. 4B in PAD which can generally be executed by the data processing system including the arrangement shown in FIG. 4A.

Figure 6:
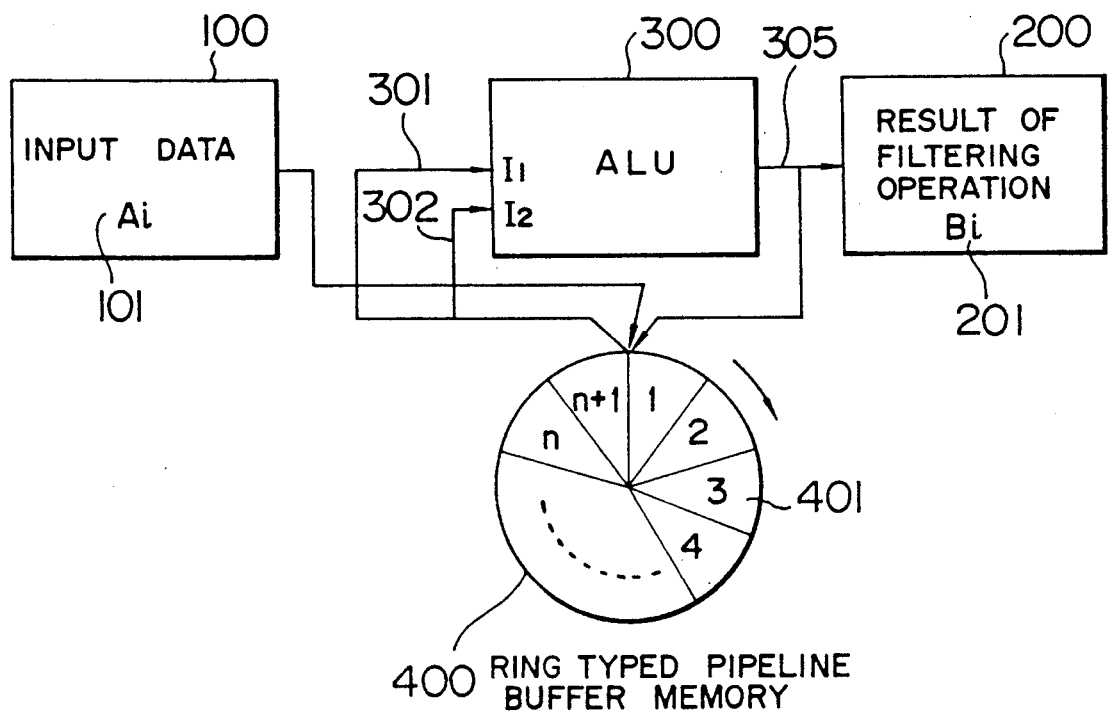
FIG. 6 shows schematically a structure of a pipeline processing system for carrying out the filtering method according to another embodiment of the invention.
Figure 8A:
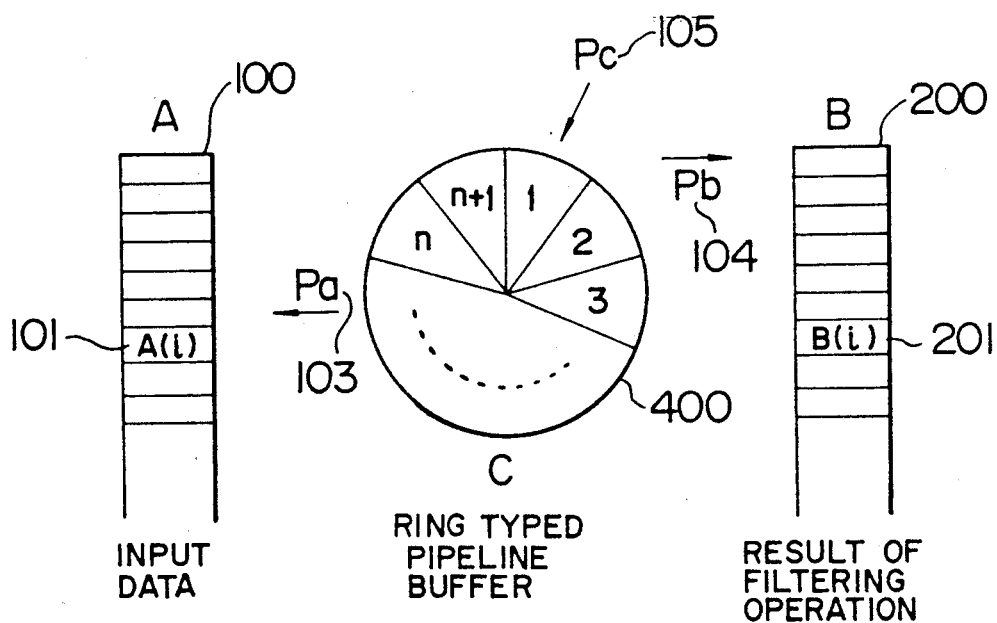
FIG. 8A shows schematically a structure of a ring type pipeline processing system for carrying out the data filtering method according to another embodiment of the present invention.
Figure 7:
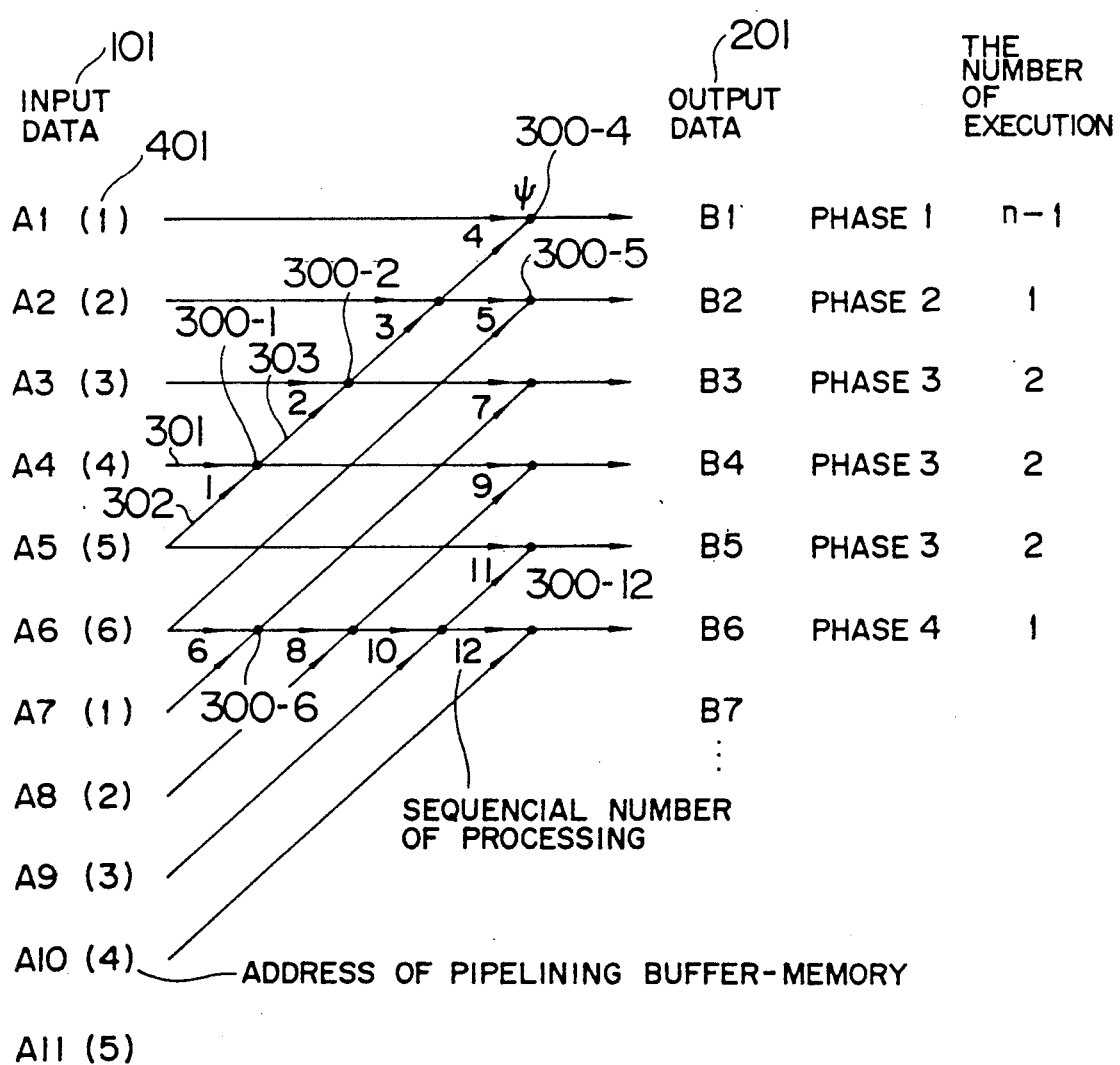
FIG. 7 is a view for illustrating the filtering operation executed by using a pipeline buffer on the assumption that the filtering is performed with a filter size of "5"
Figure 8B:
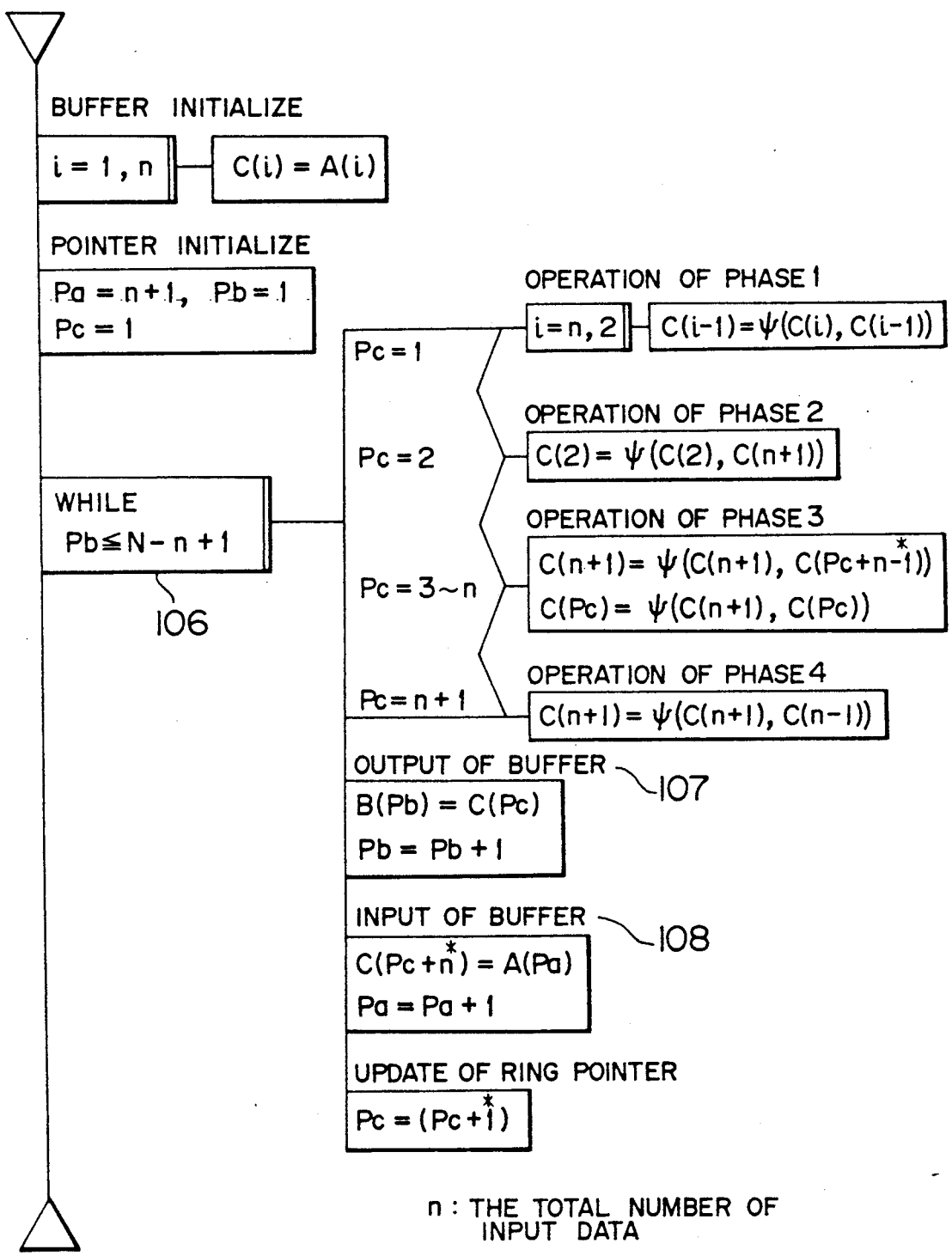
FIG. 8B is a view for illustrating the filtering procedure performed by the system shown in FIG. 8A in a PAD chart.

FIGS. 6, 7 and 8 show another embodiment of the present invention which is improved in respect to the processing efficiency by adopting the pipeline arrangement. More specifically, FIG. 6 shows a system arrangement, FIG. 7 is a view for illustrating the use of a pipeline buffer for the filter size n of "5", and FIGS. 8A and 8B are views for illustrating the procedure of execution by PAD.

Referring to FIG. 6, the output 305 of an arithmetic logic unit or ALU 100 is also utilized as the input to a ring type pipeline buffer 400. The content $A_i$ of the input data 101 and the content of the ring type pipeline buffer 400 undergo operation by the ALU 300. Of the results of the ALU operation, the final result data is stored in the memory 200 for storing the results of filtering while the interim data are stored in the ring type pipeline buffer 400, which provides $(n+1)$ cells for the filter size of n.

Next, description will be made in detail in connection with the pipeline buffer on the assumption that the filter size n is "5". The order of the operands at each operation is the same as the processing illustrated in FIG. 3. In the case of the example shown in FIG. 7, however, the processing of the individual input data is performed by using repeatedly the six ring pipeline buffers. At first, the input data $A_1$ to $A_5$ are stored at the addresses 1 to 5 the buffer 401. Next, the binomial operation at the node 300-1 shown in FIG. 7 is performed on the two operands 302 and 303 by using the data values stored at the addresses 4 and 5 of the buffer 401, respectively. The result of this binomial operation is stored in the pipeline buffer 401 at the address 4. In FIG. 7, the dots in black represent the filtering operations, while n represents the filter size. Further, in the same figure, the positions of the operation representing dots indicate the addresses of the pipeline buffer at which the results of the associated operations are stored. By way of the example, the result of operation at the node 300-1 is stored at the address 4 of the pipeline buffer while that of the operation 300-2 is stored at the address 3, as will be seen in FIG. 7. Further, the numerals attached to the operation representing dots "." on the lower left side represent the order of the operations. Up to the operation 300-4, operation can be performed with the input data $A_1$ to $A_5$ set initially. However, at the next operation 300-5, the value of $A_6$ is newly required. Accordingly, the value of $A_6$ is stored at the address of the pipeline buffer.

In the operation 300-5, the value of $A_6$ is used to derive the result $B_2$, being followed by a step where the address of the ring type pipeline buffer is returned to the original address 1 at which $A_7$ is subsequently stored. At this time point, the input data $A_1$ stored previously is erased. However, since the use of this data $A_1$ is completed at the stage where the result $B_1$ of the output data is determined through the operation 300-4, there arise no problems in connection with the rewriting of $A_1$ by $A_7$. Subsequently, by inputting the data values $A_8$, $A_9$ and $A_{10}$ to the pipeline buffer at the addresses 2, 3 and 4, respectively, the associated operations are performed. In this manner, through the twelve operations up to the operation 300-12, there can be derived six filtering results $B_1$, $B_2$, ..., $B_6$. By introducing the concept of the phase elucidated hereinbefore in conjunction with FIG. 5, there can be established the following phases 1 to 4.

Phase 1: operation procedures 1 to 4 for deriving $B_1$
Phase 2: operation procedures 5 for deriving $B_2$
Phase 3: operation procedures 6 to 11 for deriving $B_3$ to $B_5$ (*Two operations are required for deriving one result of filtering*)
Phase 4: operation procedures 12 for deriving the result $B_6$ With the arrangement mentioned above, the six succeeding results $B_7$ to $B_{12}$ of filtering can be derived by repeating in the same manner the processing performed for the input data by using the ring type pipeline buffer upon determination of the results $B_1$ to $B_6$. More specifically, when the succeeding address $A_{11}$ is stored at the address 5 of the ring type pipeline buffer, subsequent operations can be realized by the first operation on the content stored at the addresses 5 and 4 of the buffer, being followed by the second operation on the result of the first operation and the content stored at address 3 and so forth in the same manner as in the case of determination of the results $B_1$ to $B_6$. In this way, the total number of operations in the pipeline processing is $3n-3$, and hence the average number of operations for deriving the result is $(3n-3)/(n+1)$, which is approximately three (3). The advantage of the instant method is seen in that there is no need for making access to the input data row for reading the data $A_7$ to $A_{10}$ at this time point. In other words, only the first single access to the input data row is sufficient, since the data stored in the ring type pipeline buffer can be utilized in the second and succeeding operations. Ordinarily, the input data row includes a large amount of data, and in many applications such as, for example, a magnetic file system, the speed or rate of data transfer between the file system and the arithmetic logic unit (ALU) is relatively low. In such an application, a relatively smaller amount of data to be transferred is advantageous in that the processing speed can be correspondingly increased. Additionally, the method now under consideration can assure good controllability because of improved repeatability of the procedure.

FIGS. 8A and 8B are views for illustrating PAD procedure in a generalized form for the procedure shown in FIG. 7 where it is assumed that $n=5$. More specifically, FIG. 8A shows a data structure and FIG. 8B shows a flow chart. In these figures, a reference numeral 103 designates a pointer Pa indicating the addresses for the input data row 100, numeral 104 designates a pointer Pb indicating the addresses for the filtering result row 200, and 105 designates a pointer Pc indicating addresses of the ring type pipeline buffer 400. Further, reference numeral 101 denotes the input data $A(i)$, 201 denotes the results $B(i)$ of filtering, 401 denotes the content $C(i)$ in the ring type pipeline buffer, and 106 denotes the total number N of the input data. The PAD procedure now under consideration is substantially similar to that shown in FIG. 5 except for some differences which will be described below.

It is first noted that the processings in the phases 1 to 4 are performed on the contents C(i) of the ring type pipeline buffer. This is because the input data row A(i) has been copied to (i). The actual operations are performed through the procedure described hereinbefore in conjunction with FIG. 7.

The copying of A(i) to C(i) and outputting of B(i) from C(i) are executed as a new procedure in the form of inputting to the buffer and outputting from the buffer, as indicated at 108 and 107, respectively, in FIG. 8B. In connection with the output from the buffer, it is noted that the transfer from C(i) to B(i) may be spared by directly outputting the final result of the filtering procedure comprising the phase 1 to phase 4.

Parenthetically, the ring type pipeline buffer may be implemented with the same number of cells as the filter size n. In that case, the processing may be performed similarly to the case where (n+1) cells are provided. However, since the value of the ring counter is incremented by "1" when return is made from the phase 4 to the phase 1, the programmed procedure may become more or less complicated without departing from the teachings of the present invention.

Figure 9A:
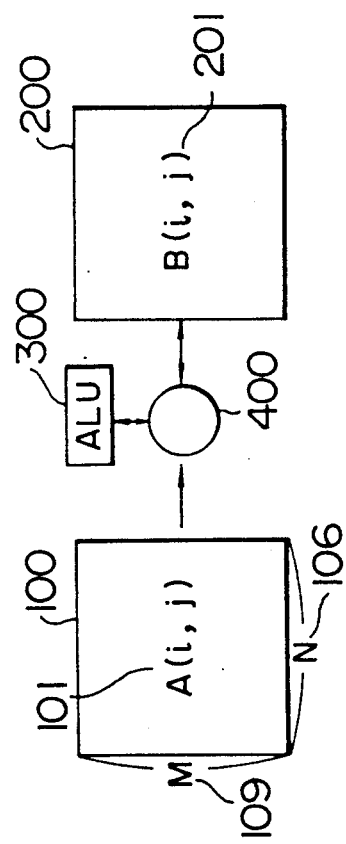
FIGS. 9A, 9B and 9C are views for illustrating application of the data filtering method according to another embodiment of the present invention to the processing of two-dimensional data.
Figure 9B:
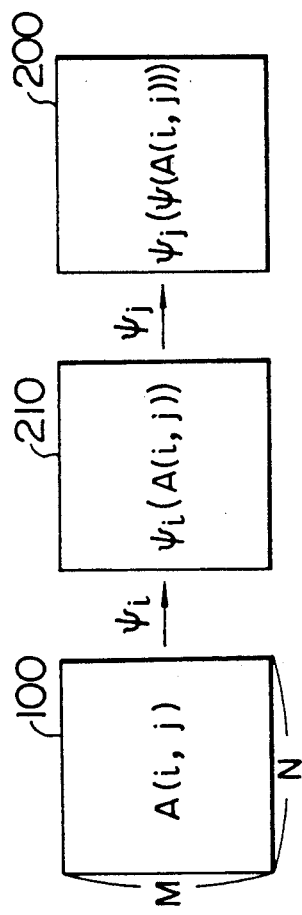
Figure 9C:
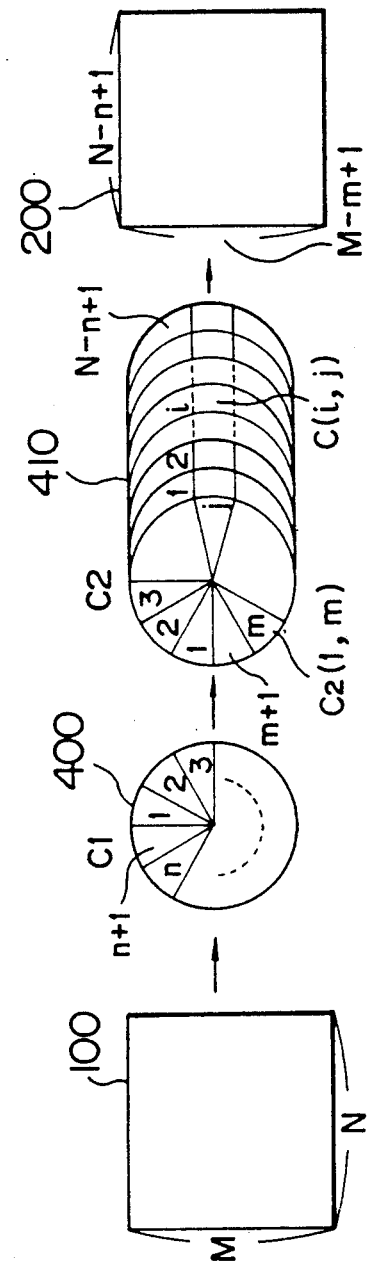

FIGS. 9A to 9C show another embodiment of the present invention applied to the filtering processing of a two-dimensional data array. In these figures, the same reference numerals are used for designating same the or like items as those mentioned in the foregoing except for reference numeral 210 which designates the results of filtering in the direction i and reference numeral 410 which designates a ring type pipeline buffer. In handling the two-dimensional data, filtering is first performed in one dimensional direction, being followed by the filtering in the other dimensional direction. In other words, the processing of the two-dimensional data array can be executed by using the filtering device twice. FIG. 9A shows a structure of the filtering device and FIG. 9B shows the filtering procedure. It is now assumed that the filter size is represented by (n×m). In the filtering in the direction i, operation must be executed 3(n−1) times for the (n+1) outputs. Thus, when the filtering in the direction i is to be performed over the whole plane or array, the number of operations determined by the following expression is necessitated on the assumption that the input data size is represented by (N×M).

$$M \times \frac{N - n + 1}{n + 1} \times 3(n - 1) \approx 3M \times N \quad (11.1)$$

provided that N>>n. The result as obtained can be expressed as follows:

$$\phi_i(A(i, j))$$

The total number of the valid data at this stage is given by $$(N-n+1) \times M$$

Subsequently, the filtering is performed in the direction j. The number of operations involved in this filtering is determined as follows:

$$(N - n + 1) \times \frac{M - m + 1}{m + 1} \times 3(m - 1) \approx 3N \times M \quad (11.2)$$

where M, N>>n, m.

In totaling the numbers given by the expressions (11.1) and (11.2), it will be seen that the filtering of the two-dimensional data array can be accomplished by 6 NM operations (i.e. executing the operation 6 NM times).

In addition, there can be conceived an arrangement in which two stages of the ring type pipeline buffers are provided, as is shown in FIG. 9C. More specifically, a ring type pipeline buffer including (n+1) cells is provided at the first stage for executing the filtering in the direction i. The results of this filtering are inputted to the pipeline buffer of the second stage. The second stage pipeline buffer is composed of a two-dimensional array of cells given by (N−n+1)×(m+1), which cells are represented by $C_2(i, j)$. The (n+1) results derived from the filtering at the first stage are stored in the cells $C_2(1, 1), C_2(2, 1), \ldots, C_2(n+1, 1)$. Subsequently, the filtering in the direction i is sequentially performed on the row A(i, 1), the result being stored in the associated cells $C_1$, respectively. Consequently, the cells on the first row, i.e. $C_2(1, 1), C_2(2, 1), \ldots, C_2(N-n+1, 1)$ are placed with the results of the filtering performed on the data A(1, 1) in the direction i with the filter size n, respectively. This processing is executed on the first to m-th rows of A(i, j), which will result in that the cells $C_2(i, j)$ are placed with the (N−b+1)×m two-dimensional data $C_2(j, j)$ where i=1 to N−b+1, j=1 to m. Next, filtering in the direction j is performed on the first column of the cells $C_2(1, 1), C_2(1, 2), \ldots, C_2(1, m)$, whereby the result B(1, 1) is obtained. By executing this processing (N−n+1) times with i being varied every time, there can be derived a first row of the results namely, $$B(2, 1), B(3, 1), \ldots, B(N-n+1, 1)$$

These results may be copied a memory for storing the rows of the results of filterings.

Next, the filtering in the direction i is performed on the (m+1)-th row of A(i, j), i.e. A(1, m+1), A(2, m+1), ..., A(n, m+1). To this end, n data A(1, m+1), A(2, m+1), ..., A(n, m+1) are inputted to the $C_1$-ring type pipeline buffer and the filtering is performed in the direction i. The result of this filtering is stored in $C_2(1, m+1)$.

Similarly, for A(n+1, m+1), A(n+2, m+1) and so forth, the results are sequentially determined according to the procedure described hereinbefore with reference to FIG. 8, and the corresponding outputs are stored sequentially at $C_2(2, m+1), C_2(3, m+1), \ldots, C_2(N- +1, , m+1)$, respectively. At this time point, all the data are available for the processing of the phase 2 in the direction j. Accordingly, the filtering of the phase 2 is performed in the direction j by using the $C_2$-ring type pipeline buffer. In other words, the filtering operation is performed on the data of the second row and the (m+1)-th row, resulting in the results of the filtering on the second row, as follows:

$$B(1, 2) = \phi(C_2(1, 2), C_2(1, m + 1))$$
$$B(2, 2) = \phi(C_2(2, 2), C_2(2, m + 1))$$
$$\vdots$$
$$B(N - n + 1, 2) = \phi(C_2(N - n + 1, 2), C_2(N - n + 1, m + 1))$$

Next, preparation is made for the processing of the phase 3. That is, the filtering in the direction i is performed on the data $A(1, m+2), A(2, m+2), \ldots, A(N, m+2)$ by using $C_1$-pipeline buffer. The results are stored in the pipeline buffer $C_2$, as follows:

$$C_2(1, 1), C_2(2, 1), \ldots, C_2(N-n+1, 1)$$

Operation is then performed on the first and the $(m+1)$-th row of the pipeline buffer $C_2$, the results of which are again stored in the pipeline buffer $C_2$, as follows:

$$C_2(1, m+1), C_2(2, m+1), \ldots, C_2(N-n+1, m+1)$$

Thus, $$C_2(1, m+1) \leftarrow \phi(C_2(1, m+1), C_2(1, 1))$$
$$C_2(2, m+1) \leftarrow \phi(C_2(2, m+1), C_2(2, 1))$$
$$\vdots$$
$$C_2(N-n+1, m+1) \leftarrow \phi(C_2(N-n+1, m+1), C_2(N-n+1, 1))$$

Operation of the above results and the data of the third row in the pipeline buffer $C_2$ produces the third row of the results, as follows:

$$B(1, 3) \leftarrow \phi(C_2(1, m+1), C_2(1, 3))$$
$$B(2, 3) \leftarrow \phi(C_2(2, m+1), C_2(2, 3))$$
$$\vdots$$
$$B(N-n+1, 3) \leftarrow \phi(C_2(N-n+1, m+1), C_2(N-'n+1, 3))$$

The above is the processing of the phase 3 in the direction j.

Subsequently, this processing in the direction j is repeated by interleaving the processing in the direction j until the processing of the phase 4 has been completed in the direction j. The procedure described above may then be repeated, starting from phase 1. According to this method, the final results can be derived by performing the operation 6NM times for the two-dimensional data array.

In the example illustrated in FIG. 9C, the filtering is first performed in the direction i, being followed by the filtering in the direction j. It should however be understood that the filtering may be carried out in the order of the directions j and i by interchanging the pipeline buffers $C_1$ and $C_2$ with each other shown in FIG. 7C. Particularly when the input data are stored in an external storage unit requiring not an insignificant time for making the access, the latter method capable of transferring a large amount of data at one time is more advantageous.

When the method described above by reference to FIGS. 9A-9C is extended to the k-dimensional data array, the increase in the number of the dimensions affects only the adding operation. In other words, the filtering of all the number of the picture elements $N_1 \times N_2 \times N_3 \times \ldots, \times N_k$ with the filter size of $n_1 \times n_2 \times n_3 \times \ldots, \times n_k$ can be accomplished by operation performed approximately the number of times given by $$3kN_1 \times N_2 \times N_3 \times \ldots, \times N_k \qquad (12)$$

It should be mentioned that application of the present invention to a part of the k dimensions instead of all of k dimensions can ensure substantially similar effect. In other words, it goes without saying that the effect corresponding to the number of dimensions as used can be attained.

When the filter is a medium filter, the binomial operation is performed in the manner mentioned below. The input data are in the form of rows in which the data are arrayed in the order of small to large values (or vice versa). Namely, $$(d_{i1}, d_{i2}, \ldots, d_{im}), \text{ and}$$

$$(d_{im+1}, d_{im+2}, \ldots, d_{in})$$

Of course, the input data of one term is admissible. The binomial operation is to create the numeral value row from combination of the two inputs.

In the case of the medium filter, the processing for selecting the medium value is added at the final stage.

In the case of the summing filter, the binomial operation ALU may be constituted simply by adders.

Figure 10:
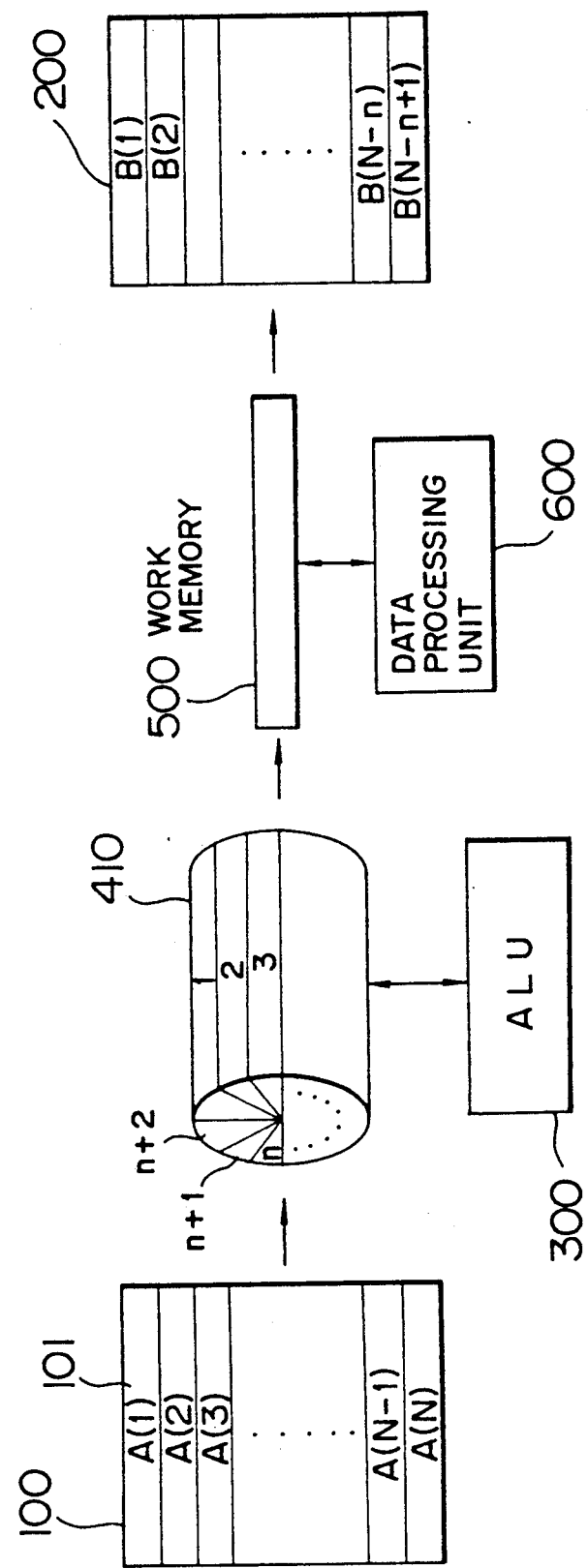
FIG. 10 shows schematically a structure of a system for carrying out the filtering method according to still another embodiment of the invention applied to the processing of compressed data of run length code.
Figure 11:
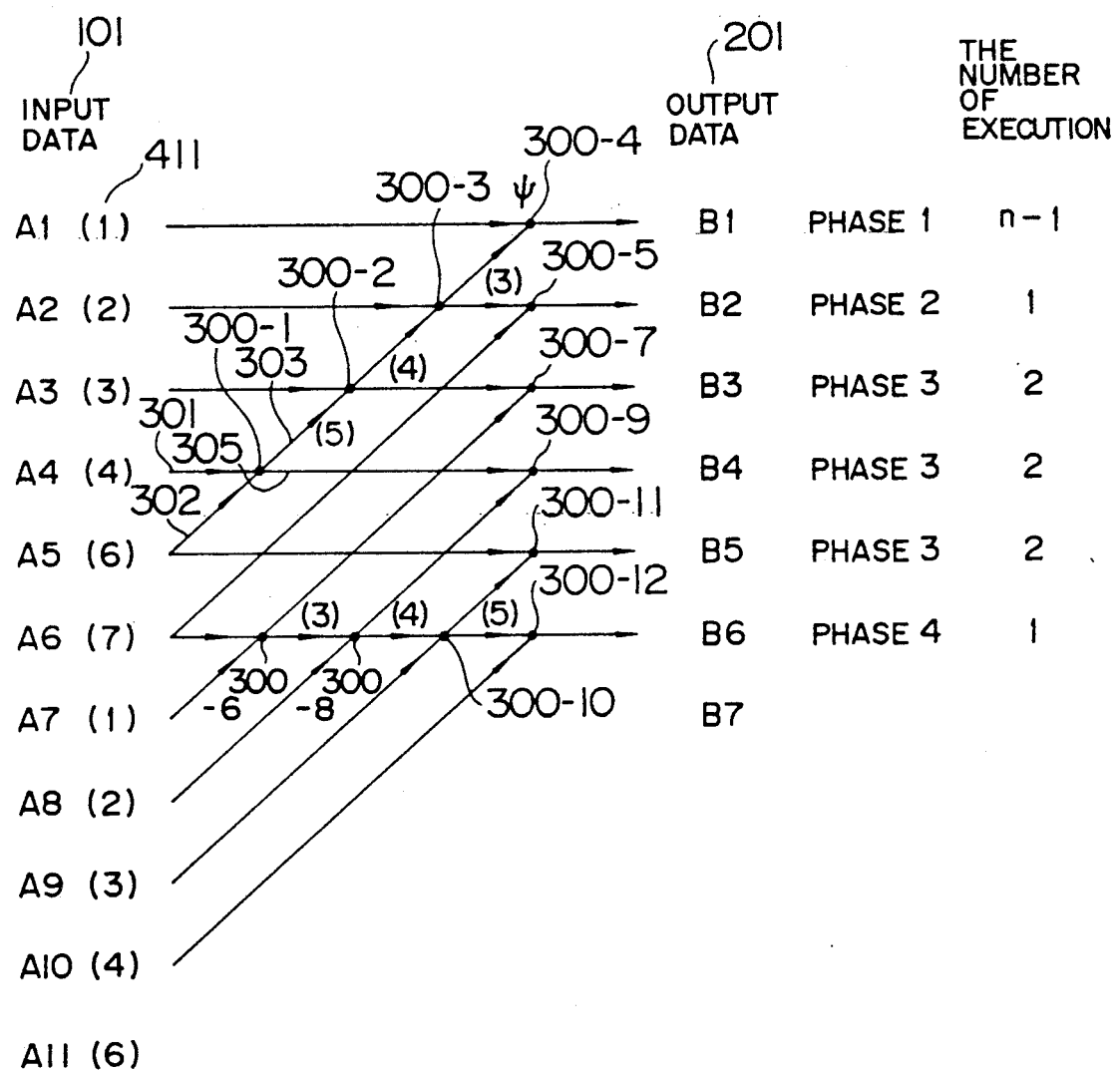
FIG. 11 is a view for illustrating the processing procedure performed by using the system shown in FIG. 10.

FIGS. 10, 11 and 12 show a further exemplary embodiment of the present invention applied to the processing of two-dimensional data having a data structure in which the data is not segmented on the pixel basis in the horizontal (line wise) direction as in the case of the compressed data of the run length code. According to the instant embodiment, a number of ring type pipeline buffers each for one line of input data are made use of. In the case where expansion or shrinking is produced in the length of the resultant data derived through the processing, there may arise the possibility that the original data may be destroyed upon storage of the result derived through the processing of two lines of the input data because of the excessively large length of the data to be written. Under the circumstances, there are provided according to the teaching of the invention incarnated in the instant embodiment $(n+2)$ lines for the ring type pipeline buffer where n represents the filter size.

FIG. 10 shows, by way of example, the type of processing in which filtering in the vertical direction is performed three times for each line while other processing such as, for example, pattern matching is carried out in the horizontal (linewise) direction. So far as the arguments are interchangeable in the horizontal (linewise) processing, the instant embodiment can be practically realized. The horizontal processing may be performed by using a work memory 500 and a data processing unit 600.

FIG. 11 illustrates the flow of processing, FIG. 12 is a view for illustrating how to use the ringtyped pipeline buffer 410 when $n=5$, and FIG. 13 is a view for illustrating the processing procedure by PAD.

At first, description will be made of the processing flow by reference to FIG. 11. In this figure, $A_i$ represents the input data (a run length code row corresponding to one line). It should however be appreciated that this data is variable in length. Further, solid dots in black represent the partial filtering operation (i.e. filtering operation over two lines). Finally, n represents a filter length (e.g., mask size "5" in the direction linewise).

Of the input data rows 100, the input data 101 is inputted to the ring type pipeline buffer to undergo filtering in the vertical direction by using the arithmetic logic unit or ALU 300. The result of this filtering operation is transferred to the work memory 500 to undergo subsequently the horizontal (linewise) filtering by using the data processing unit, whereby the final result 200 can be derived. It should be noted that the data processing unit may be constituted by a conventional microprocessor programmed to be able to perform desired controls and arithmetic operations. By virtue of the provision of the ring type pipeline buffer 410 for holding the result of operation, the data processing unit can make access directly to the one line of data stored in the ring type pipeline buffer for thereby determining the result of operation. In the case where this result is outputted in a straightforward manner as the result 200 of the filtering, the work memory 500 shown in FIG. 10 may be spared.

Next, description will be made of the use of he ring type pipeline buffer by reference to FIGS. 10 and 11. In this figure, reference numeral 101 designates the input data, and 411 designates the address of a ring type pipeline buffer (hereinafter referred to simply as buffer address). In particular, the reference numeral 411 designates the buffer address at which the input data is to be stored at first. Since it is assumed that n=5 also in the case of this example, the buffer addresses are "1" to "7". In other words, two extraneous buffers are prepared. In this connection, it is to be noted that the input data $A_1$, $A_2$, $A_3$, $A_4$ and $A_5$ in a row are inputted in the order of (1), (2), (3), (4) and (6) by neglecting the last data $A_5$.

In the case of the instant embodiment, phases 1 to 4 are provided as elucidated below.

Phase 1: procedure for determining the results up to $B_1$ in the first row (line)

Phase 2: procedure for determining the result $B_2$ for the second row (line)

Phase 3: procedure for determining the results of third row to the n-th row (fifth row in the case illustrated in FIG. 11)

Phase 4: procedure for determining result of the (n+1)-th row (sixth row in the case illustrated in FIG. 9)

In the phase 1, operation 300-1 is performed first on the operands 301 and 302 which correspond to the contents $A_4$ and $A_5$ stored at the addresses (4) and (6) of the ringtyped pipeline buffer 140, respectively. The output data resulting from this operation are written at the buffer address identified by the parenthesized number inserted at the upper right to the black dot indicating the operation, as will be seen in FIG. 11. Accordingly, the output data from the operation 300-1 is written in the buffer at the address (5) as indicated by a reference numeral 305. By virtue of this procedure, the operation can be completed normally even when the data length is elongated or shrunk.

In the processing of the phase 1, the succeeding operations 300-2, 300-3 and 300-4 are successively executed, whereby the result $B_1$ of filtering is derived. The number of times of operations up to this time point is (n−1) on the assumption that one line is processed once. Finally, as the preparation for the phase 2, the input data of $A_6$ is inputted to the buffer address (7). (Of course, this inputting step may be included in the processing of phase 2, and the same applies validly to the last data inputting in the processing of the phases 2 to 4.)

Next, in the processing of the phase 2, the operation 300-5 is executed. More specifically, a product is determined between the contents of the buffer address (3) where the results of the vertical filtering performed for the second to fifth lines $A_2$ to $A_5$ are placed and the content $A_6$ placed at the buffer address (7), whereby the result $B_2$ is derived for the second line. The next input data $A_7$ is placed at the address (1) of the ring type pipeline buffer 1. This procedure is advantageous in that the transition from the phase 4 to the succeeding phase 1 described hereinafter can be conveniently simplified by the fact that the processing may be started in the same manner as in the case of the first processing of the phase 1.

Subsequently, in the phase 3, operations 300-7, 300-9 and 300-11 are executed for deriving the results $B_3$ to $B_5$, respectively. In this case, the data resulting from the operation 300-6, 300-8 and 300-10 are sequentially stored at the buffer addresses (3), (4) and (5). Accordingly, at the end of the phase 3, there remain the data $A_7$, $A_8$, $A_9$ and $A_{10}$ at the buffer addresses (1), (2), (3) and (4), respectively.

Finally in the phase 4, operation (300-12) is performed on the contents placed at the buffer addresses (5) and (4), respectively, whereby all the results are derived for six lines. Subsequently, data $A_{11}$ is inputted to the buffer address (6). In this way, (n+1) results $B_1$ to $B_6$ (where n=5) are determined through 3(n−1) operations, i.e., 12 operations in the case of the instant example, while the input data of five lines $A_7$, $A_8$, $A_9$, $A_{10}$ and $A_{11}$ remain at the addresses (1), (2), (3), (4) and (6) of the ring type pipeline buffer. This array of the input data and the manner in which the ring type pipeline buffer is used are the same as the first processing in the phase 1 where the results $B_1$ to $B_6$ were determined on the basis of the input data $A_1$ to $A_5$. Accordingly, the processing for the whole area can be accomplished by repeating the processing of the phases 1 to 4.

In the case of the example mentioned above, the number of pipeline times is given by (3n−3) with the average number of operations times required for deriving one output being given by (3n−3)/(n+1). In this case, the amount of data for one line differs between the input data and the output data. In other words, the amount of data is variable. When the amount of data is variable as in the case of the example described above, the filtering can be carried out effectively by using the pipeline buffer having a length corresponding to (n+2).

Figure 12B:
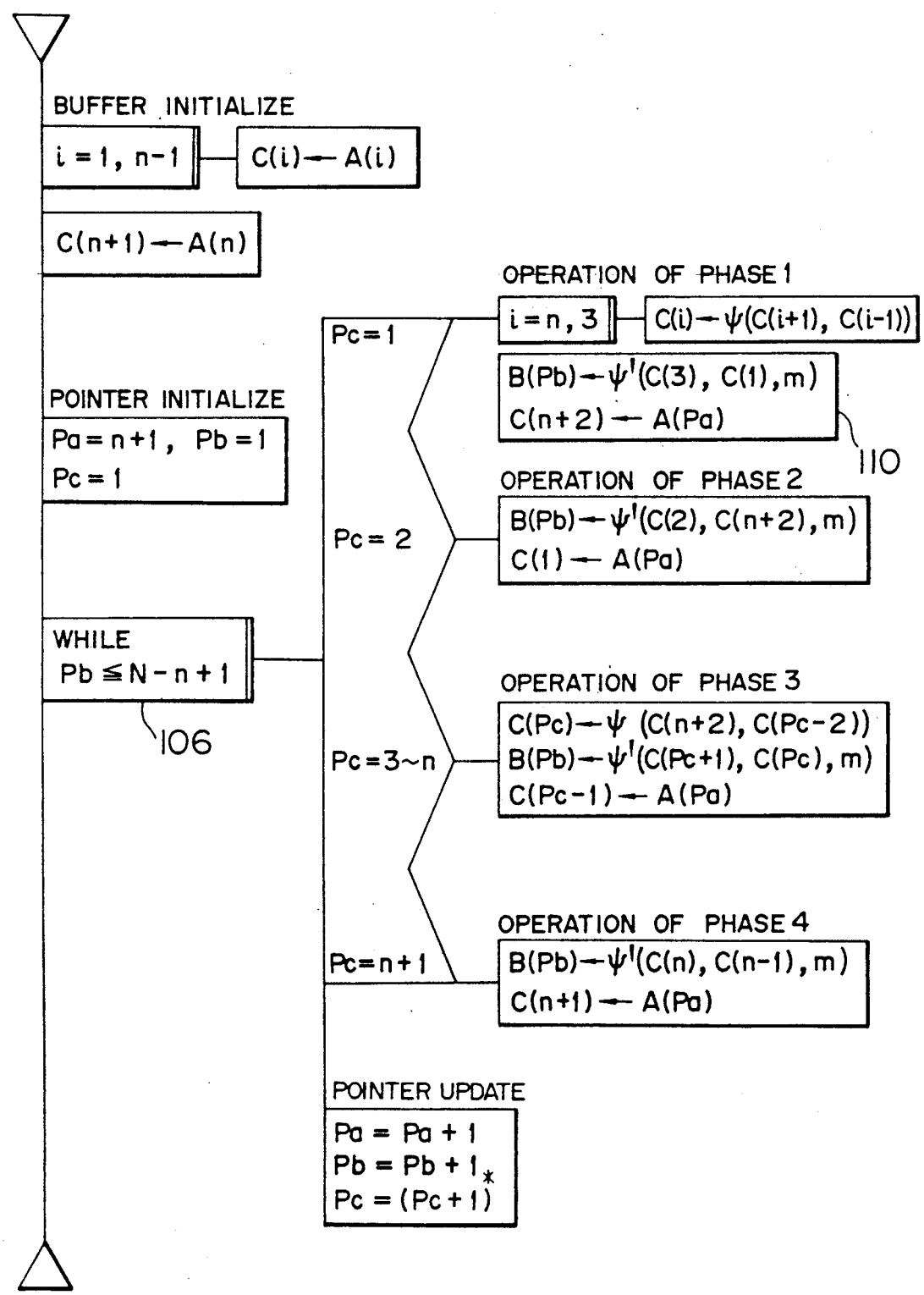
FIG. 12B illustrates in a PAD chart the filtering procedure executed according to the above method.

FIGS. 12A and 12B show in a generalized form the flow of processings elucidated above in PAD. In the figures, reference numerals and symbols have the same meanings as those used in FIG. 8. It should however, be noted that the following function is newly introduced as the i-directional filtering function:

$$\phi'(C(i), C(j), n)$$

This function is used for performing the filtering with a filter size in the horizontal direction for the result derived from the vertical filtering between the two lines C(i) and C(j). This horizontal filtering corresponds to the operation performed by using the data processing unit 600 shown in FIG. 10. Except for this, the procedure is same as described in conjunction with FIG. 11.

In summary, in the vertical filtering illustrated in FIGS. 10 to 12, all the results can be determined by the number of times of operations given by $$\frac{3(n-1)}{n+1}$$

for the result of one line.

Figure 13A:
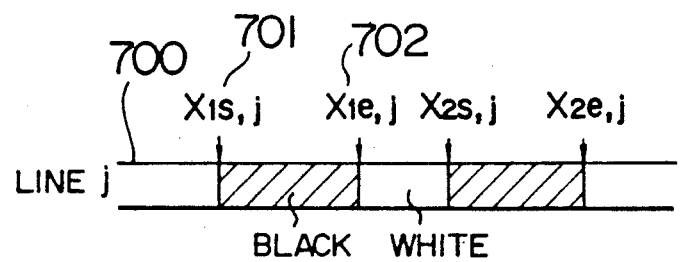
FIGS. 13A, 13B and 13C are views for illustrating the filtering method according to a further embodiment of the invention.
Figure 13B:
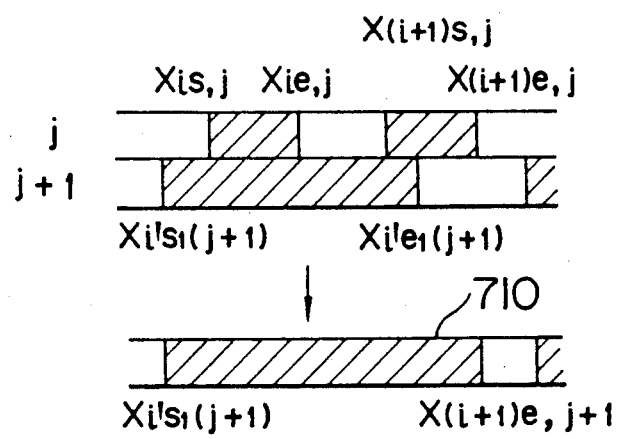
Figure 13C:
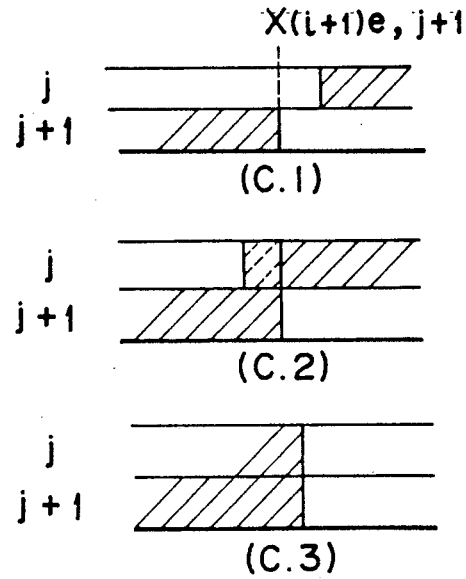

FIGS. 13A, 13B, and 13C include an exemplary embodiment of the present invention applied to the vertical filtering for the compressed data of the run length code on the assumption that an enlarged filter of 2 lines × one column size for two lines data is employed with the data being stored on the run length basis. Further, the run length data is represented by the start coordinate value and the end coordinate value of the run in black (indicated by hatching) shown in FIG. 13A. Examples of the inputs to the vertical filtering and the results thereof are illustrated in FIG. 13B.

It is now assumed that the i-th run on the j-th line is expressed as follows:

$$(X_{is,j}, X_{ie,j}) \tag{13.1}$$

Similarly, the (i+1)-th run is expressed by $$(X_{(i+1)s,j}, X_{(i+1)e,j}) \tag{13.2}$$

Further, the i'-th run on the (j−1)-th line is expressed by $$(X_{i's,(j+1)}, X_{i'e,(j+1)}) \tag{13.3}$$

It is further assumed that the following conditions are satisfied in the example shown in FIG. 13B.

$$X_{i's,(j+1)} < X_{is,j} < X_{ie,j} < X_{(i+1)s,j} < X_{i'e,j+1} < X_{(i+1)e,j+1} \tag{13.4}$$

Conventionally, the 2 lines×1 column filtering is realized by executing ORing operation on the pixels on two lines. In contrast, according to the teaching of the present invention, the filtering is realized by determining the maximum and minimum values of the edge coordinates of the runs on two lines. More specifically, in the case of the illustrated example, the run data are extracted from two lines j and (j+1), being followed by deriving the minimum value of the start coordinates of these run data. Since the start coordinate values of the runs given by the expressions (13.1) and (13.3) are $X_{is,j}$ and $X_{i's,(j+1)}$ respectively, the minimum value is determined from the expression (13.4), as follows $$X_{i's,(j+1)} \tag{14.1}$$

The above values are the start edge coordinates of the run which can be derived as the result of filtering for the two lines.

Next, the trailing edge of this resultant run is determined. The coordinate value of this trailing edge is not smaller than $X_{is,(j+1)}$; $X_{i'e,(j+1)}$ of the i'-th run on the (j+1)-th line starting with the coordinate value of $X_{i's,(j+1)}$. Accordingly, around the coordinate value of this trailing edge, the run on the other line (i.e., the j-th line in the case of the instant example) is checked. To this end, the runs succeeding the i-th run on the j-th line mentioned above may be sequentially checked. In this connection, there are three different methods for the check, as illustrated in FIG. 13C.

At first, when the run on the j-th line is a white run at the edge of a run on the (j+1)-th line, as shown at (C.1) in FIG. 13C, the value of the trailing edge of the run of concern starting with $X_{i's,(j+1)}$ is expressed by $$X_{(i+1)e,j+1}$$

At the next step of procedure, data of new runs on both lines j and (j+1) are extracted, whereupon the first mentioned processing for determining the minimum value of the start coordinates of these new runs may be performed.

Secondly, when the run on the j-th line is located in contact with the trailing edge of the run on the (j+1)-th line or covers partially that trailing edge (refer to dotted area), as illustrated at (C.2) in FIG. 13C, the trailing edge searching procedure may be carried out with reference to the trailing edge of the run on the j-th line.

Thirdly, when the runs on both the j-th line and the (j+1)-th line have the respective trailing edges coinciding with each other, as illustrated at (C.3) in FIG. 13C, the value of the trailing edge is used as the run end coordinate value. The processing for determining the new run may then be carried out in the same manner as in the case of (C.1) mentioned above.

Now, it is examined how the above-mentioned procedure (C.1), (C.2) or (C.3) is applied to an exemplary processing illustrated in FIG. 13B. Referring to this figure, the run on the j-th line located at the trailing edge of the run on the (j+1)-th line having the coordinates of $X_{i'e,(j+1)}$ is a black run. This corresponds to the abovementioned case (C.2). Accordingly, the run on the (j+1)-th line is checked with reference to the trailing edge $X_{(i+1)e,j}$ of the black run on the j-th line. Since the run on the (j+1)-th line at this location is a white run, the value $X_{(i+1)e,j}$ is determined as the trailing edge of the resultant run. Subsequently, a black run is searched by checking both successive lines j and (j+1).

In the course of the searching process mentioned above, there may arise a situation in which the trailing edge coincides with the end edge of one or both lines. In that case, the coordinate value of the line end are determined in the same manner as that of the trailing edge of the run being searched. On the other hand, when the leading edge is searched, the searching is completed without doing anything, whereupon the processing for the succeeding line is started.

When the result of the comparison of the runs on two lines shows that both the runs have the same value, the latter is determined as the value of the leading edge of both runs, being followed by the comparison of both runs with respect to the trailing edge, wherein the processing for searching the trailing edge may be carried out with reference to the trailing edge having a greater value. When both the trailing edges have a same value, any one of the leading and trailing edges may be adopted without giving rise to any problem.

The foregoing description has been made of the expanded processing executed by checking the coordinate values of leading and trailing edges between the runs on two lines by reference to FIGS. 13A, 13B and 13C. According to this method, the filtering processing performed heretofore on the pixel-by-pixel basis can be carried out on the run basis. Since the number of runs is significantly smaller than that of the pixels (picture elements), a speeding up of the processing can be realized. Further, it is noted that the procedure for determining the minimum and maximum values requires merely the conventional arithmetic operation and thus can be implemented with the aid of a general purpose processor. In other words, the processing according to the invention can be executed without resorting to the dedicated hardware to another great advantage.

Similarly, speeding up can be attained in the shrinking processing according to the teaching of the present invention. In this case, the processing for determining a common portion of the black runs on two lines may be performed. More specifically, the maximum value of the leading edges and the minimum value of the trailing edges are determined for the two runs.

$(X_{is,j}; X_{ie,j})$ $(X_{is,(j+1)}; X_{ie,(j+1)})$

The run between the maximum value and the minimum value is determined as the run resulting from the filtering. In case the maximum value is smaller than the minimum value, this means that no common black run portion exists between the two runs.

In this way, the processing is sequentially performed for searching the subsequent runs. More specifically, of the two runs just searched, the run having the trailing edge of smaller coordinate value is updated. When the runs on both lines exhibit the same value at the respective trailing edges, both runs are updated, being then followed by a new searching of a common run portion of black runs.

Figure 14:
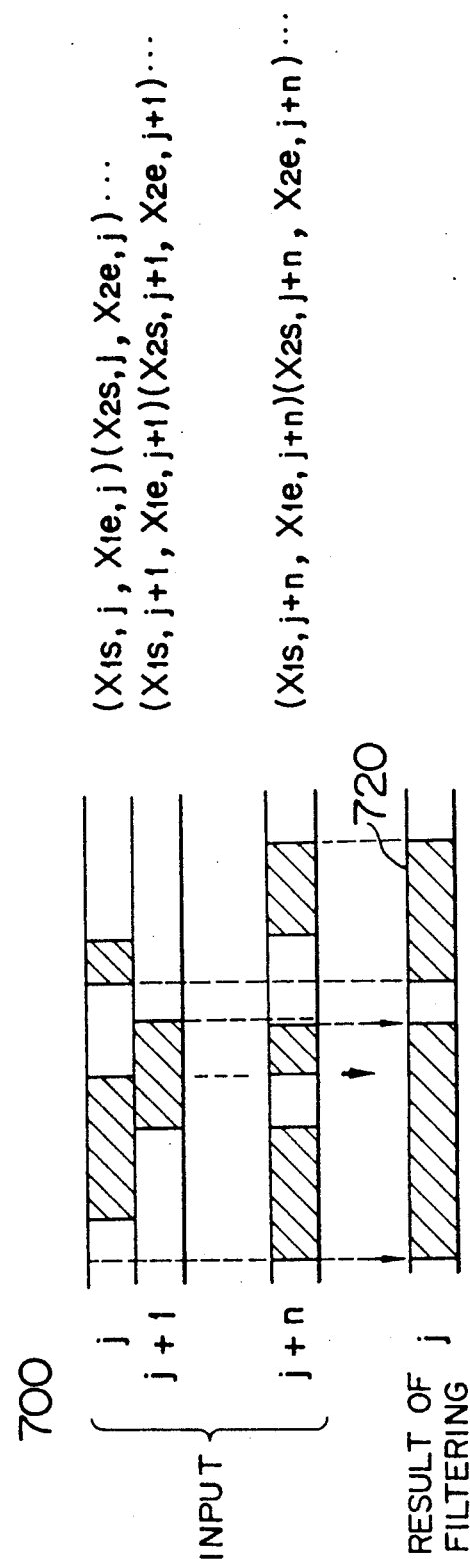
FIG. 14 is a view illustrating another embodiment of the present invention.

FIG. 14 is a view for illustrating extension of the method illustrated in FIG. 13 to the processing of n lines. In this representative case, expanded filtering with a size of n (lines) x one (pixel) is performed on n lines including the j-th to the (j+n−1)-th line. It is now assumed that the black runs are expressed in the data format identical with that shown in FIG. 13A. As illustrated in FIG. 14, the runs on the individual lines are represented as follows:

$(X_{1s,1}; X_{1e,1})(X_{2s,1}; X_{2e,1}) \ldots (X_{is,1}; X_{ie,1}) \ldots$
$(X_{1s,2}; X_{1e,2})(X_{2s,2}; X_{2e,2}) \ldots$ $(X_{1s,j}; X_{1e,j})(X_{2s,j}; X_{2e,j}) \ldots$ The expanded filtering processing with the mask size of (n×1) for these data is performed in the manner mentioned below:

At first, the runs are extracted from the first to n-th lines, respectively. Namely, the following runs are taken out.

$(X_{1s,1}; X_{1e,1})(X_{1s,2}; X_{1e,2}) \ldots (X_{1s,n}; X_{1e,n})$  (15)

Next, the run having the start coordinates (the leading edge address of the black run) of the minimum value is extracted from these runs. In case several runs satisfying this condition exist, any one of them may be selected. The one run as extracted is temporarily stored as the result of filtering. The values of this run is expressed as follows:

$(X_s; X_e)$  (16.1)

Next, a succeeding run is extracted from the input data of the line from which the abovementioned run has been extracted and fitted to the expression (15). Again, the run having the leading edge of the minimum value is determined from the n runs and expressed as follows:

$(X_s'; X_e')$  (16.2)

In the expression (16.1) and (16.2), the following relation applies valid:

$X_s \leq X_s'$

In dependence on the values of $X_e$, $X_s'$ and $X_e'$, either one of two types of processings mentioned below is performed.

(1) When $X_e < X_s'$,
$(X_s; X_e)$ is registered as the result of the filtering. Further, $(X_s'; X_e')$ is newly registered provisionally, whereupon the succeeding processing is performed, as will be described hereinafter.

(2) When $X_s' \leq X_e$,
The value of trailing edge of the provisionally registered $(X_s; X_e)$ is replaced by $Max(X_e'; X_e)$ which is then provisionally registered, whereupon the succeeding processing is performed.

Parenthetically, when the leading and trailing edges of a black run are determined to be the coordinates of a sampled point, the two runs $(X_s; X_e)$ and $(X_{e+1}; X')$ are interconnected provided that $X_{e+1} < X'$. In this case, the aforementioned conditions (1) and (2) are replaced by (1) $X_e + 1 < X_s'$, and
(2) $X_s < X_{e+1}$, respectively.

After the processings (1) and (2), a run succeeding to the extracted run from the line to which the latter belongs is taken out and the processing for searching the run having the leading edge of the minimum value is repeated for n runs including the extracted succeeding run mentioned above and the runs already extracted from the (n−1) lines.

In the foregoing, an example of the extended filtering with the filter size of (n×1) for the compressed data of the run length code has been described. Further speeding up of this procedure can be realized as follows.

In connection with the aforementioned condition (2), the extracted runs $(X_s'; X_e')$ which satisfy the condition $X_s' \leq X_e' \leq X_3$  (17)

exert no influence to the result at all. In other words, at the stage where the provisionally registered run has been determined, the run of concern exists on the other lines.

The run in which at least one of the leading and trailing edges is smaller than $X_e$ need not be processed. Accordingly, at this stage, the run of the line data of each line which satisfies the condition given by the expression (17) is neglected while the first run which does not satisfy the condition (17) is extracted, whereby further speeding up of the processing can be attained.

The foregoing procedure taught by the present invention is advantageous in that the filtering can be realized with the aid of the conventional arithmetic logical operation for detecting the maximum and minimum values of the coordinates of the runs, and in that the amount of operation involved does not depend on the number of pixels but on the number of runs. The requisite processing can be realized by using a general purpose system such as inexpensive office machines requiring only a small space for installation. Nevertheless, high performance of operation can be assured.

The processing for the shrinkage filtering of n lines may be performed in the manner described below. In the first place, the first runs are extracted from the first to n-th lines, respectively, through the same processing as mentioned hereinbefore in conjunction with the expansion or extension processing. In other words, the runs given by the following expressions are extracted as is in the case represented by the expressions (15).

$$(X_{1s,1}; X_{1e,1}), (X_{1s,2}; X_{1e,2}), \ldots, (X_{1s,n}; X_{1e,n}) \quad (15)'$$

Next, the maximum value of the leading edges and the minimum value of the trailing edges of these runs are extracted. Representing the maximum value and the minimum value by $X_s$ and $X_e$, respectively, then $$X_s = max(X_{1s,1}, X_{1s,2}, \ldots, X_{1s,n}) \quad (18.1)$$

$$X_s = min(X_{1e,1}, X_{1e,2}, \ldots, X_{1e,n}) \quad (18.2)$$

The relation which applies valid between these two values $X_s$ and $X_e$ is either one of the following two:

(1) $X_s < X_e$ (2) $X_e \leq X_s$

First, the relation (1) will be considered. In this case, the run having these two values at the leading and trailing edges does exist as a black run. This run is thus expressed by $$(X_s, X_e) \quad (19)$$

Accordingly, this run is registered as a run of the result.

Next, one run having the same trailing edges as $X_e$ is extracted from those represented by the expressions (15)'. One or more such runs must exist. Subsequently, a next run is extracted from the line to which the above-mentioned extracted run belongs. Thus, when the line of concern is i-th line, the second run on the i-th line is extracted, which can be expressed as follows:

$$(X_{2s,i}, X_{2e,i}) \quad (20)$$

Subsequently, shrinking filtering is applied around this run. In this connection, it is noted that the runs on the other lines which have no portions common to the run given by the expression (20) have no influence a the result of the filtering. Since the individual runs on each line are arrayed starting from the one having the smallest coordinate value, the run having the trailing coordinate value equal to or smaller than $X_{2s,i}$ of the run given by the expression (20) may be put aside from the consideration. Accordingly, these runs on each line are neglected until a run having the trailing edge coordinate value greater than $X_{2s,i}$ of the expression (20) is encountered, which run is then extracted. This processing is performed on the remaining lines, and the runs for n-lines are assembled, whereby n runs are derived similarly to those given by the expression (15)'. On the basis of this set of runs, the processing for determining the maximum and minimum values of the leading and trailing edges, respectively, is performed.

Next, the relation (2) will be considered. The relation that $X_e \leq X_s$ means "the leading edge is present on the right side to the trailing edge". In actuality, the run of this sort can not exist. Accordingly, registration of $(X_s, X_e)$ given by the expression (19) is discarded and the subsequent processing is immediately performed. To this end, the one run having the leading edge coordinate value which coincides with $X_s$ is extracted from those given by the expressions (15)'. When this one run lies on the i-th line, $$(X_{1s,i}, X_{1e,i}) \quad (21)$$

Around this run, the runs on the other lines are updated. This updating is carried out in the same manner as described hereinbefore with the relation (1). More specifically, those runs on each line which have the trailing edge values smaller than $X_{1s,i}$ of the expression (21) are put aside from the consideration, and the first occurrence of the run having the trailing edge value exceeding $X_{is,i}$ of the expression (21) is extracted. The subsequent processing is the same as that described hereinbefore in conjunction with the relation (1).

In the foregoing, a method of shrinkage filtering has been explained. It goes without saying that when no more run is found in the course of searching the run, the processing is shifted to the succeeding run. In case no run is present initially (e.g., when a whole line is white), the result is obviously "white". Accordingly, upon processing of a line, it is first checked if that line has no black runs. If so, the processing proceeds to a succeeding line.

Further, in the case of shrink filtering with (n+1), a white line renders the results of filtering for n lines in total overlying and underlying that white line to be "white". Accordingly, when the last line is proven to be wholly white in the course of the sequential processing, not only the line resulting from the processing being executed at that time point but also the succeeding (n−1) lines are determined to be white, whereupon the processing is in a straightforward manner transferred to the line succeeding the (n−1)-th line.

When one or several wholly white lines make an appearance in the first line processing or in n lines extracted in the processing succeeding the processing for making n lines to be wholly white, attention is paid to the last wholly white line of the several lines. If this line is the i-th line (the first line=1), the successive i lines inclusive of the line being processed are determined to be wholly white, whereupon succeeding processing is performed.

In the expansion filtering processing, the presence of one wholly black line causes n lines to be wholly black. By taking into account this fact, the speeding up of the expansion filtering processing can be accomplished. The processing for this purpose may be performed in the same manner as in the case of the shrinkage filtering processing except that the resultant lines are made wholly black instead of being wholly white.

As will be now appreciated, the shrinkage filtering according to the present invention provides advantageous effects similar to those of the expansion filtering processing.

Further, speed-up of the processing can be attained by using the ring type pipeline buffer. More specifically, in the exemplary embodiment described hereinbefore in conjunction with FIG. 10, the processing performed by the ALU (arithmetic logic unit) 300 may be executed as the expansion or shrinkage filtering processing for two lines. In association with this processing, the method described by reference to FIGS. 10, 11 and 12 may be executed to thereby achieve the advantageous effects provided by the run length code compression processing method described above in conjunction with FIG. 13. They are:

(1) The number of processings does not depend on the number of pixels but depends on the number of runs, whereby speed-up of the processing can be accomplished.

(2) The processings can be executed by a general purpose system due to the use of the ring type pipeline buffer.

(3) For one line output, the number of operations given by $3(n-1)/(n+1)$ (where n represents filter size) is sufficient, which means that speeding up of the processing can be realized substantially independently of the filter size.

These effects are mutually combined to provide a generally or universally usable method which can enjoy extremely high-speed execution.

It should also be mentioned that in the system in which the data compression technique is combined with the pipeline technique, the high-speed processing procedure described hereinbefore in conjunction with the processing for the wholly black or white line is applicable. An example of this application will be described below.

Reference is made to FIG. 12. At the stage of buffer initialization,
(1) when a line having a black run filling the whole line is present in the case of the expansion filtering, the result lines are unconditionally processed as being wholly black, and
(2) when a wholly white line is present in the case of the shrinkage filtering, the associated result lines are unconditionally processed so as being wholly white.

The number of the lines to undergo such processing is i, when the line of concern is the i-th line with the first line being identified by "1".

Subsequently, the following pointer initialization processings are executed.

$$Pa = n+i+1, \; Pb = i+1, \; Pc = 1 \qquad (22)$$

Further, as the second buffer initialization, the following processings are executed.

$$C(1) \leftarrow A(i+1), \; C(2) \leftarrow A(i+2)$$
$$\ldots$$
$$C(n-1) \leftarrow A(i+n-1), \qquad (23)$$
$$C(n+1) \leftarrow A(i+n)$$

The succeeding processings are performed in accordance with the PAD procedure illustrated in FIG. 12. When a wholly black line (in expansion filtering) or a wholly white line (in shrinkage filtering) makes an appearance at this time point, the whole line blackening processing or whole line whitening processing is performed up to that line represented by a number i' in accordance with the expressions (22) and (23) where i is replaced by i'. Further, when the wholly black line or wholly white line makes an appearance upon inputting of the input data to the ring type line buffer performed at the end of the phase 1, phase 2, phase 3 or the phase 4, respectively, the processing is performed as mentioned below. Assuming that the value of the pointer Pb at this time point is represented by i", the white or black lines are $(i''+n)$. Consequently, the result lines affected by the filtering processing of n lines are $$i''+1, i''+2, \ldots, i''+n$$

Accordingly, these n lines are determined to be the wholly white lines or the wholly black lines. In the processings given by the expressions (22) and (23), the following processing is performed similarly to the initial processing.

$$i''+n+1 \rightarrow i$$

In other words, by skipping the remaining phases of the processing, the contents of the buffer such as pointer and other data are updated, whereupon the processing is performed from the beginning of the phase of concern.

Next, description will be turned to the inventive expansion/shrinkage filtering in the horizontal direction for the compressed data of the run length code. Data of one line are expressed as follows:

$$(X_{1s}, X_{1e}), (X_{2s}, X_{2e}), \ldots, (X_{Ns}, X_{Ne}) \qquad (24)$$

It is assumed, by way of example, that the expansion filtering is performed on these data with the filter size of n.

When the start coordinate value of the image is represented by $X_o$, the leading edge of the first result run is given by
$$X_{1s}' = max(X_o, X_{1s}-n+1) \qquad (25.1)$$

By using this value as the leading edge value, the first run $$(X_{1s}'; X_{1e}) \qquad (25.2)$$

is provisionally registered.

Subsequently, the second run is extracted and a run $$(X_{2s}-n+1; X_{2e}) \qquad (25.3)$$

is created. At this time point, it is checked whether the leading edge defined by the expression (25.2) can be combined with the run defined by the expression (25.3). To this end, the trailing edge of the run (25.2) and the leading edge of the run (25.3) are compared with each other.
(1) When $X_{1e} < X_{2s}-n+1$, the run given by the expression (25.2) is registered as the result run, while the run given by the expression (25.3) is provisionally registered, whereupon it is checked whether the run (25.3) can be combined with the run resulting from the expansion of a succeeding run.
(2) When $X_{1e} \geq X_{2s}-n+1$, the trailing edge of the run (25.2) is replaced by the trailing edge of the run (25.3), whereupon $$(X_{1s}', X_{2e})$$

is newly registered provisionally in place of the preceding run registered provisionally. Subsequently, the possibility is checked as to whether the run registered provisionally at this time point can be combined with the run resulting from the processing of a succeeding run.

The processings described above are repeatedly executed successively until the last run, which remains in the provisionally registered state in the form of $$(\ldots, X_{Ne}) \qquad (25.4)$$

Upon registering this last run, the processing comes to an end.

The shrinkage (contraction) filtering can be executed in the manner mentioned below. At first, the first run is extracted from those given by the expressions (24). At that time,
(1) When $X_{1s} < X_{1e}-n+1$, $(X_{1s}; X_{1e}-n+1)$ is registered, whereupon the processing proceeds to the next run, while (2) When $X_{1s} \geq X_{1e} - n + 1$, no registration is performed and the processing proceeds to the next run.

The above processing (1) or (2) is executed for all the runs.

From the foregoing, the expansion/shrinkage filtering in the horizontal direction according to an embodiment of the invention will be understood. Since these processings require solely simple arithmetic operations of a number of times corresponding to that of the runs, there can be achieved a significant speeding up of the processing as a whole.

By adopting this method in the operation of the data processing unit shown in FIG. 10, the following advantageous effects can be obtained.

(1) Speeding up of the filtering in the horizontal direction.

(2) Further increase of the filtering processing speed due to the possibility of using a ring type pipeline buffer.

In the foregoing, several preferred embodiments of the present invention have been described only by way of example. It should be understood that numerous modifications, alternations and changes in the details thereof will readily occur to those skilled in the art without departing from the spirit and scope of the present invention.

Summarizing the advantageous effects brought about by the present invention, there may be mentioned the following.

1. Filtering can be executed through operations of a number of times substantially independent of magnitude of the filter size. More specifically, with the filter size of n, the filtering for each output or result basically may be accomplished through operations of a number of times of $3(n-1)/(n+1) \sim 3$. As a result, filtering with a large filter size as required in image processing, document processing, drawing processing, (color) picture processing, (voice) wave processing and so forth in offices and workshops can be rendered practical, whereby highly intellectual processing such as recognitions, analyses and the like which are heretofore impractical can now be realized.

Further, n-dimensional data can basically be processed with 3k processings for one output data. By way of example, with the filter of $50 \times 50$, there have heretofore been required about 2500 operations for one output. In contrast, according to the present invention, six operations are sufficient for one output. In this way, the speeding up of the processing by two and half orders of magnitude can be realized.

2. By making use of a ring type pipeline buffer, the number of the accesses to the input data can be decreased significantly. Ordinarily, the input data are of an extremely large amount and hence stored in an external file system in most cases. By decreasing the number of times the file is accessed, remarkable speeding up of the overall processing can be accomplished. To be more concrete, four accesses are heretofore required for one output. In contrast, one access is sufficient according to the teaching of the present invention. In other words, four times as high of a speeding up can be realized.

In the filtering of compressed data the number of processings is independent of that of the pixels (picture elements) but depends on the number of the runs. To be more concrete, in the case of ordinary documents and drawings, the number of pixels is greater than that of the runs by two or more orders of magnitude. In other words, the number of the processings can be decreased by a factor on the order of 10 1 (ten), whereby the processing can be executed at a correspondingly increased high speed.

4. Further, according to the invention, filtering of the compressed data can be executed by using a general purpose system capable of conventional arithmetic operation without need for any specific or dedicated circuits. Thus, the processing can be performed inexpensively by making use of numerous one of commercially available general-purpose machines As will now be appreciated, the present invention provides an epoch-making contribution in the field of processing of drawings, document, images, waves and like data in addition to various processings given up heretofore because of the large amount of time involved

We claim:

1. In a data processing system including sensing means for sensing an image and converting said image into input image data, preprocessing means connected to receive said input image data for filtering noise from said input image data, and data conversion means connected to receive said filtered input image data for converting said filtered input image data into output data, said preprocessing means including filter means for performing said noise filtering having n memory means for storing at least 2n pieces of data and operand interchangeable arithmetic means for performing a predetermined operation on said stored pieces of data, a data processing method of converting said input image data into said output data when said filter means is n-sized comprising the steps of:

sensing said image with said sensing means and converting said image into said input image data;

filtering noise from said input image data with said preprocessing means in order to produce first through (n+1)th filtered outputs of said preprocessing means;

converting said filtered input image data into said output data with said data conversion means;

said noise filtering step comprising the steps of:

(a) storing said input image data addresses of said memory means;

(b) inputting data stored in a first address of said memory means and data stored in a second address of said memory means to said arithmetic means and storing a result of an arithmetic operation performed on said data input from said first and second addresses in said first address;

(c) decrementing said first and second addresses by 1;

(d) repeating steps (b)–(c) $n-2$ times;

(e) inputting the first arithmetic operation result stored in said first memory and data stored in a third address of said memory means to said arithmetic means and outputting a result of an arithmetic operation performed on said first arithmetic operation result and said data input from said third address as said first filtered output of said preprocessing means;

(f) inputting the first arithmetic operation result stored in said first address and data stored in a fourth address of said memory means to said arithmetic means and outputting a result of an arithmetic operation performed on said first arithmetic operation result and said data input from said fourth address as said second filtered output of said preprocessing means;

(g) inputting said data stored in said fourth address and data stored in a fifth address of said memory means to said arithmetic means and storing a result of an arithmetic operation performed on said data input from said fourth and fifth addresses in said fourth address;

(h) inputting the arithmetic operation result stored in said fourth address and the last arithmetic operation result stored in said second address to said arithmetic means and outputting a result of an arithmetic operation performed on said arithmetic operation result input from said fourth address and the last arithmetic operation input from said second address as a filtered output of said preprocessing means;

(i) incrementing said second and fifth addresses by 1;

(j) repeating steps (g)-(i) n−2 times in order to provide the third through nth filtered outputs of said preprocessing means; and (k) inputting the last arithmetic operation result stored in said fourth address and data stored in a sixth address of said memory means to said arithmetic means and outputting a result of an arithmetic operation performed on said last arithmetic operation result input from said fourth address and said data input from said sixth address as said (n+1)th filtered output of said preprocessing means.

2. A data processing method according to claim 1, wherein:
said arithmetic operation results stored in said first address during the repetition of steps (b)-(c) in step (d) are stored in a register; and
said arithmetic operation results stored in said register are utilized in steps (g)-(k).

3. A data processing method according to claim 1, wherein:
said arithmetic operation results stored in said fourth address during the repetition of steps (g)-(i) in step (j) are stored in a register; and
said arithmetic operation results stored in said register are utilized in steps (g)-(k).

4. A data processing method according to claim 1, wherein:
said input image data is two-dimensional data;
when said filter means is (n×m)-sized, steps (a)-(k) are executed in order to produce filtered outputs of said preprocessing means for one dimensional direction of said two-dimensional input image data, and n is made to equal m in steps (g)-(k) for every 2m pieces of data in the other dimensional direction of said two-dimensional input image data; and
steps (a)-(k) are repeated through address shifting so that the filtered outputs of said preprocessing means are shifted by (m+1) outputs at a time.

5. In a data processing system including sensing means for sensing an image and converting said image into at least 2n pieces of input image data, preprocessing means connected to receive said input image data for filtering noise from said input image data, and data conversion means connected to receive said filtered input image data for converting said filtered input image data into output data, said preprocessing means including filter means for performing said noise filtering having a ring-type pipeline buffer of at least n+1 cells for storing first to nth data at first to nth addresses of said pipeline buffer, respectively, and operand interchangeable arithmetic means for performing a predetermined operation on said input data, a data processing method of converting said input image data into said output data when said filter means is n-sized comprising the steps of:

sensing said image data with said sensing means and converting said image into said input image data;
filtering noise from said input image data with said preprocessing means in order to produce first through (n+1)th filtered outputs of said preprocessing means;
converting said filtered input image data into said output data with said data conversion means;
said noise filtering step comprising the steps of:
(a) storing said input image data in addresses of said pipeline buffer;
(b) inputting data stored in an (n−1)th address of said pipeline buffer and data stored in an nth address of said pipeline buffer to said arithmetic means and storing a result of an arithmetic operation performed on said data input from said (n−1)th and nth addresses in said (n−1)th address;
(c) decrementing said (n−1)th and nth addresses by 1;
(d) repeating steps (b)-(c) n−1 times;
(e) outputting an arithmetic operation result stored in the first address of said pipeline buffer as said first filtered output of said preprocessing means;
(f) storing (n+1)th data at an (n+1)th address of said pipeline buffer;
(g) inputting an arithmetic operation result stored in a second address of said pipeline buffer and the data stored in the (n+1)th address of said pipeline buffer to said arithmetic means and outputting a result of an arithmetic operation performed on said arithmetic operation result input from said second address and the data input from said (n+1)th address as said second filtered output of said preprocessing means;
(h) storing (n+2)th data at said first address of said pipeline buffer;
(i) inputting the data stored in said (n+1)th address of said pipeline buffer and the data stored in said first address of said pipeline buffer to said arithmetic means and storing a result of an arithmetic operation performed on said data input from said (n+1)th and first addresses in said (n+1)th address of said pipeline buffer;
(j) inputting the arithmetic operation result stored in said (n+1)th address of said pipeline buffer and an arithmetic operation result stored at a third address of said pipeline buffer during the repetition of steps (b)-(c) in step (d) to said arithmetic means and outputting a result of an arithmetic operation performed on said arithmetic operation result input from said (n+1)th address and said arithmetic operation result input from said third address as a filtered output of said preprocessing means;
(k) incrementing said first address of said pipeline buffer and said third address of said pipeline buffer by 1;
(l) repeating steps (h)-(k) n−2 times in order to provide said third through nth filtered outputs of said preprocessing means;
(m) storing (2n)th data at the (n−1)th address of said pipeline buffer;

(n) inputting the last arithmetic operation result stored in said (n+1)th address during the repetition of steps (h)-(k) in step (1) and the data stored in said (n−1)th address to said arithmetic means and outputting a result of an arithmetic operation performed on said last arithmetic operation result input from said (n+1)th address and said data input from said (n−1)th address as said (n+1)th filtered output of said preprocessing means; and (o) storing (2n+1)th data at the nth address of said pipeline buffer.

6. A data processing method according to claim 5, wherein:

said input data is N×M two-dimensional data;

when said filter means is (n×m)-sized, steps (a)-(o) are executed in order to produce filtered outputs of said preprocessing means for one dimensional direction of said two-dimensional input image data, and n is made to equal m in steps (a)-(o), for every 2m pieces of data in the other dimensional direction of said two-dimensional output image data; and steps (a)-(o) are repeated through address shifting so that the filtered outputs of said preprocessing means are shifted by (m+1) outputs at a time.

7. A data processing method according to claim 5, wherein:

said input image data is N×M two-dimensional data;

said filter means of said data processing system further includes a second ring-type pipeline buffer having (N−n+1)×(m+1) two-dimensional cells; and when said filter means is (n×m)-sized, said noise filtering step further comprises the steps of:

(p) inputting data stored in an (m−1)th address of said second pipeline buffer and data stored at in mth address of said second pipeline buffer to said arithmetic means and storing a result of an arithmetic operation performed on said data input from said mth address in said (m−1)th address;

(q) decrementing said (m−1)th and mth addresses by 1;

(r) repeating steps (p)-(q) m−1 times;

(s) outputting an arithmetic operation result stored in a first row address of said second pipeline buffer as a filtering output of a first row of said second pipeline buffer in said preprocessing means;

(t) storing data of an (m+1)th row of said filtered outputs produced during steps (a)-(o) at an (m+1)th address of said second pipeline buffer;

(u) inputting an arithmetic operation result stored in a second row address of said second pipeline buffer and data stored in an (m+1)th row address of said second pipeline buffer to said arithmetic means and outputting a result of an arithmetic operation performed on said arithmetic operation result input from said second row address and said data input from said (m+1)th row address as a filtering output of a second row of said second pipeline buffer of said preprocessing means;

(v) storing data of an (m+2)th row of said filtered outputs produced during steps (a)-(o) in a first row address of said second pipeline buffer;

(w) inputting data stored in an (m+1)th row address of said second pipeline buffer and data stored in the first row address of said second pipeline buffer to said arithmetic means and storing a result of an arithmetic operation performed on said data input from said (m+1)th row address and said data input from said first row address in said (m+1)th row address;

(x) inputting the arithmetic operation result stored in said (m+1)th row address of said second pipeline buffer and the last arithmetic operation result stored in a third row address of said second pipeline buffer during the repetition of steps (p)-(q) in step (r) to said arithmetic means and outputting a result of an arithmetic operation performed on said arithmetic operation result input from said (m+1)th row address and the last arithmetic operation result input from said third row address as a filtering output of said second pipeline buffer of said preprocessing means;

(y) incrementing the first row address and the third row address by 1;

(z) repeating steps (v)-(y) m−2 times in order to provide arithmetic operation results obtained in steps (v)-(y) as third to mth row filtering outputs of said second pipeline buffer of said preprocessing means;

(a') storing data of a (2m)th row of said filtered outputs produced during steps (a)-(o) in an (m−1)th row address of said second pipeline buffer;

(b') inputting the arithmetic operation result stored in said (m+1)th row address of said second pipeline buffer and the data stored in said (m−1)th row address of said second pipeline buffer and outputting a result of an arithmetic operation performed on said arithmetic operation result input from said (m+1)th row address and said data input from said (m−1)th row address as a filtering output of the (m+1)th row of said second pipeline buffer of said preprocessing means; and (c') storing data of a (2m+1)th row of said filtered outputs produced during steps (a)-(o) in an mth address of said second pipeline buffer.

8. In a data processing system including sensing means for sensing an image and converting said image into at least 2n pieces of input image data, preprocessing means connected to receive said input image data for filtering noise from said input image data, and data conversion means connected to receive said filtered image input data for converting said filtered input image data into output data, said preprocessing means including filter means for performing said noise filtering having a ring-type pipeline buffer of at least an n+2 cells for storing first to nth data at first to (n+1)th addresses, excepting an nth address, and operand interchangeable arithmetic means for performing a predetermined operation on said input image data, a data processing method of converting said input data into said output data when said filter means is n-sized comprising the steps of:

sensing said image with said sensing means and converting said image into said input image data;

filtering noise from said input image data with said preprocessing means in order to produce first through (n+1)th filtered outputs of said preprocessing means;

converting said filtered input image data into said output data with said data conversion means;

said noise filtering step comprising the steps of:
(a) storing said input image data in addresses of said pipeline buffer;
(b) inputting the data stored in the (n−1)th address of said pipeline buffer and the data stored in the (n+1)th address of said pipeline buffer to said arithmetic means and storing a result of an arithmetic operation performed on said data input from the (n−1)th address and said data input from the (n+1)th address in the nth address of said pipeline buffer;
(c) decrementing said (n−1)th address and said nth address by 1;
(d) repeating steps (b)-(c) n−1 times;
(e) outputting an arithmetic operation result stored in a second address of said pipeline buffer as said first filtered output of said preprocessing means;
(f) storing (n+1)th data at an (n+2)th address of said pipeline buffer;
(g) inputting an arithmetic operation result stored in a third address of said pipeline buffer and data stored at an (n+2)th address of said pipeline buffer to said arithmetic means and outputting a result of an arithmetic operation performed on said arithmetic operation result input from the third address and said data input from the (n+2)th address as said second filtered output of said preprocessing means;
(h) storing (n+2) data at a first address of said pipeline buffer;
(i) inputting the data stored in said (n+2)th address of said pipeline buffer and data stored in said first address of said pipeline buffer to said arithmetic means and storing a result of an arithmetic operation performed on said data input from said (n+2)th address and said data input from said first address in the third address of said pipeline buffer;
(j) inputting the arithmetic operation result stored in the third address and an arithmetic operation result stored in a fourth address of said pipeline buffer during the repetition of steps (b)-(c) in step (d) to said arithmetic means and outputting a result of an arithmetic operation performed on said arithmetic operation result input from said third address and said arithmetic operation result stored in said fourth address as a filtered output of said preprocessing means;
(k) incrementing said first, third and fourth addresses of said pipeline buffer by 1;
(l) repeating steps (h)-(k) n−2 times in order to produce said third through nth filtered outputs of said preprocessing means;
(m) storing (2n)th data at an (n−1)th address of said pipeline buffer;
(n) inputting an arithmetic operation result stored in said nth address of said pipeline buffer and the data stored in said (n−1)th address of said pipeline buffer to said arithmetic means and outputting a result of an arithmetic operation performed on said arithmetic operation result input from said nth address and said data input from said (n−1)th address as said (n+1)th filtered output of said preprocessing means;
(o) storing (2n+1) data in an (n+1)th address of said pipeline buffer.

9. A data processing method according to claim 8, wherein said at least 2n pieces of input data are expressed as a compressed code.

10. A data processing method according to claim 9, wherein each of said at least 2n pieces of data is represented for one line having a run length code row.

11. A data processing method according to claim 10, wherein said predetermined arithmetic operation performed by said arithmetic means performs image expansion and image compression based on said run length code row.

12. A data processing method according to claim 10, wherein in a portion of said at least 2n pieces of data, when a line included within the sensed image is one of wholly white and wholly black, n filtered outputs of said preprocessing means which are affected by said portion of said at least 2n pieces of data are replaced by data corresponding to one of black and white colors without executing steps (a)-(o).

13. In a data processing system including sensing means for sensing an image and converting said image into at least 2n pieces of input image data, preprocessing means connected to receive said input image data for filtering noise from said input image data, and data conversion means connected to receive said filter input image data for converting said filtered input image data into output data, said preprocessing means including filter means for performing noise filtering having memory means for storing data and operand interchangeable arithmetic means for performing a predetermined operation on said stored data, a data processing method of converting said input data into said output data when said filter means is n-sized comprising the steps of:
sensing said image with said sensing means and converting said image into said input image data;
filtering noise from said input image data with said preprocessing means in order to produce first through (n+1)th filtered outputs of said preprocessing means;
converting said filtered input image data into said output data with said data conversion means;
said noise filtering comprising the steps of;
(a) storing said input image data in addresses of said memory means;
(b) inputting nth data and (n−1)th data to said arithmetic means and storing a result of an arithmetic operation performed on said input nth and (n−1)th data in a first of said memory means;
(c) inputting (n−2)th data to a first input of said arithmetic means and the arithmetic operation result stored in said first memory means to a second input of said arithmetic means and outputting a result of an arithmetic operation performed on said (n−2)th input to said first input and said arithmetic operation result input to said second input as a filtered output of said preprocessing means;
(d) incrementing said (n−2)th data in step (c) by 1;
(e) repeating steps (c)-(d) n+3 times;
(f) sequentially storing said arithmetic operation results output in step (c), except the last arithmetic output result output in step (c), in said first memory;
(g) outputting said last arithmetic operation result output in step (c) as said first filtered output of said preprocessing means;
(h) inputting the last arithmetic operation result output in step (c) and (n+1)th data storing in said first memory means to said arithmetic means and outputting a result of an arithmetic operation performed on said input last arithmetic operation result and said $(n+1)$th data input from said first memory means as a second filtered output of said preprocessing means;

(i) inputting $(n+1)$th data and $(n+2)$th data to said arithmetic means and storing a result of an arithmetic operation performed on said input $(n+1)$th and $(n+2)$th data in a second one of said memory means;

(j) applying the arithmetic operation result stored in said second memory means to said first input of said arithmetic means and applying the arithmetic operation results storing in said first memory means to said second input of said arithmetic means in an order which is the reverse of the order in which the arithmetic operation results stored in said first memory means were sequentially stored;

(k) performing a result of an arithmetic operation performed on said arithmetic operation results applied to said first and second inputs in step (j);

(l) applying $(n+3)$th data of said pieces of input image data to said first input of said arithmetic means and the arithmetic operation result stored in said second memory means to said second input of said arithmetic means and storing a result of an arithmetic operation performed on said applied $(n+3)$th data and said arithmetic operation result stored in said second memory means in said second memory means;

(m) incrementing said $(n+3)$th data in step (l) by 1;

(n) repeating steps (j)–(m) until the $(n+3)$th data of step (l) is equal to $(2n-1)$th data in order to produce said third through $(n-1)$th filtered outputs of said preprocessing means; and (o) applying the last arithmetic operation result stored in said second memory during the repetition of steps (j)–(m) in step (n) to said first input of said arithmetic means and applying nth data and $(2n)$th data to said second input of said arithmetic means and sequentially outputting results of arithmetic operations performed on said last arithmetic operation result applied to said first input and said nth and $(2n)$th data applied to said second input as nth and $(n+1)$th filtered outputs of said preprocessing means.

14. A data processing method wherein a filter size is represented by $n_1$ memory means for temporarily storing at least 2n pieces of data and operand interchangeable arithmetic means for performing a predetermined operation on input data are used, and one cycle of steps are repeated with respect to the 2n pieces of data stored in said memory means by address shifting so that $n+1$ pieces of data are shifted at a time, said one cycle of steps comprising:

(a) repeating a first operation including inputting data designated by a first address and data designated by a second address to said arithmetic means and storing an arithmetic operation result at said first address $(n-2)$ times by sequentially decrementing said first and second addresses by 1; and inputting a first arithmetic operation result stored at said first address at that time and data designated by a third address to said arithmetic means and providing an arithmetic operation result thereof as a first filtering output;

(b) inputting said first arithmetic operation result stored at said first address which has been decremented and data designated by a fourth address to said arithmetic means and providing an arithmetic operation result thereof as a second filtering output;

(c) repeating a second operation $(n-2)$ times, said second operation including inputting the data designated by said fourth address and data designated by a fifth address to said arithmetic means and storing an arithmetic operation result thereof at said fourth address; and inputting the arithmetic operation result stored at said fourth address and the arithmetic operation result stored at said second address which has been decremented by repeating said first operation $(n-2)$ times to said arithmetic means and providing an arithmetic operation result thereof as a filtering output;

the repetition of said second operation $(n-2)$ times being performed by incrementing said fifth and second addresses by 1 sequentially so that third to n-th filtering outputs are sequentially provided; and (d) inputting the arithmetic operation result stored at said fourth address which has been incremented by repeating said second operation $(n-2)$ times and data designated by a sixth address to said arithmetic means and providing an arithmetic operation result thereof as an $(n+1)$-th filtering output.

15. A data processing method according to claim 14, wherein:

during the repeated execution of said first operation, the arithmetic operation results which are sequentially stored at said first address are temporarily memorized in a register; and in said steps (c) and (d), the arithmetic operation results memorized in said register are used.

16. A data processing method according to claim 14, wherein:

during the repeated execution of said second operation, the arithmetic operation results which are sequentially stored in said fourth address are temporarily memorized in a register; and in said steps (c) and (d), the arithmetic operation results memorized in said register are used.

17. A data processing method according to claim 14, wherein:

said input data is two dimensional data, and said filter size is represented by $n \times m$; and one cycle of operations includes, with respect to filtering outputs obtained by executing the data processing method according to claim 20 on data in one dimensional direction of said two dimensional data, said n in said steps (c) and (d) which is replaced by m with every 2m pieces of data in the other dimensional direction; and said one cycle of operations are repeated by address shifting so that said filtering outputs are shifted by $(m+1)$ outputs at a time.

18. A data processing method comprising the steps of:

preparing a plurality of pieces of data equal to or larger than 2n which are inputted by input means; and when a filter size is represented by n, repeating one cycle of steps with respect to 2n pieces of data among said plurality of pieces of data by shifting the data by $n+1$ pieces of data at a time, by using a ring type pipeline buffer having at least n+1 cells and an operand interchangeable arithmetic means for performing a predetermined arithmetic operation on said input data;

said one cycle of steps comprising
 (a) with respect to the ring type pipeline buffer which stores first to an n-th data at first to n-th addresses, repeating a first operation including inputting the data stored at the (n−1)-th address and the data stored at the n-th address to said arithmetic means and storing an arithmetic operation result at said (n−1)-th address (n−1) times by decrementing said (n−1)-th address and said n-th address sequentially by 1; and providing the arithmetic operation result stored at the first address at that time as a first filtering output;
 (b) storing (n+1)-th data at an (n+1)-th address of said ring type pipeline buffer; and inputting said arithmetic operation result stored in the second address and the data stored in said (n+1)-th address to said arithmetic means and providing an arithmetic operation result thereof as a second filtering output;
 (c) repeating a second operation (n−2) times, said second operation including storing (n+2)-th data at the first address of said ring type pipeline buffer;

inputting the data stored at said (n+1)-th address and the data stored at said first address to said arithmetic means and storing an arithmetic operation result thereof at said (n+1)-th address; and inputting the arithmetic operation result stored at said (n+1)-th address and an arithmetic operation result stored at the third address during the repetition of said first operation after repeating (n−1) times to said arithmetic means and providing an arithmetic operation result as a filtering output;

the repetition of said second operation for (n−2) times being performed by incrementing said first address and said third address sequentially by 1 from said (n+2)-th data to said (2n−1)-th data, so that the arithmetic operation results obtained are provided sequentially as third to n-th filtering outputs; and
 (d) storing 2n-th data at an (n−1)-th address of said ring type pipeline buffer, inputting the arithmetic operation result stored at said (n+1)-th address after repeating said second arithmetic operation (n−2) times and the data stored at said (n−1)-th address to said arithmetic means and providing an arithmetic operation result as an (n+1)-th filtering output; and storing (2n+1)-th at the n-th address of said ring-type pipeline buffer.

19. A data processing method according to claim 18, wherein:

said input data is N×M two dimensional data, and said filter size is represented by n×m; and one cycle of operations includes, with respect to filtering outputs obtained by executing the data processing method according to claim 24 on data in one dimensional direction of said two dimensional data, said n in said steps 1 to 4 which is replaced by m with every 2m pieces of data in the other dimensional direction; and said one cycle of operations are repeated by address shifting so that said filtering outputs are shifted by (m+1) outputs at a time.

20. A data processing method according to claim 18, wherein said input data is N×M two dimensional data, and said filter size is represented by n×m;

one cycle of steps are repeated with respect to (N−n+1)×2m pieces of two dimensional data among the filtering outputs of a first ring type pipeline buffer having the n+1 cells obtained by sequentially executing the processing method of claim 24 on each row of said two dimensional data, said second ring type pipeline buffer having (N−n+1)×(m+1) two dimensional cells, said repetition of said one cycle of steps being performed by shifting the filtering outputs of said first ring type pipeline buffer by (N−n+1)×(m+1) outputs at a time;

said one cycle of steps by said second ring-type buffer comprising
 (e) with respect to said second ring-type pipeline buffer which stores of data of a first row to an m-th row at first row to m-th row addresses;

repeating a third operation including inputting the data stored at the (m−1)-th address and the data stored at the m-th address of said arithmetic means and storing an arithmetic operation result thereof at the (m−1)-th address (m−1) times by decrementing said (m−1)-th address and said m-th address sequentially by 1; and providing an arithmetic operation result stored at the first row address at that time as a filtering output of the first row of said second ring type pipeline buffer;
 (f) storing data of the (m+1)-th row of the filtering outputs of said first ring type pipeline buffer at an (m+1)-th address of said second ring type pipeline buffer, and further inputting said arithmetic operation result stored at the second row address and the data stored at the (m+1)-th row address to said arithmetic means and providing an arithmetic operation result thereof as a filtering output of the second row by said second ring type pipeline buffer;
 (g) repeating a fourth operation (m−2) times, said fourth operation including storing data of the (m+2)-th row of the filtering outputs of said first ring type pipeline buffer at the first row address of said second ring-type pipeline buffer;

inputting the data stored at the (m+1)-th row address and the data stored at said first row address to said arithmetic means and storing an arithmetic operation result thereof at said (m+1)-th row address, and inputting the arithmetic operation result stored at the (m+1)-th row address and the arithmetic operation result stored at a third row address during the repetition of said third operation after repeating said third operation (m−1) times to said arithmetic means and providing an arithmetic operation result as filtering outputs by said second ring-type pipeline buffer;

the repetition of said fourth operation of (m−2) times being performed by incrementing said first row address and said third row address sequentially by 1 from said (m+2)-th row data to said (2m−1)-th row data so that the arithmetic operation results thus obtained are provided sequentially as filtering outputs from third row to m-th row by said second ring-type pipeline buffer;

(h) storing data of a 2m-th row of the filtering outputs of said first ring type pipeline buffer at an (m−1)-th row address of said second ring type pipeline buffer;

inputting the arithmetic operation result stored at said (m+1)-th row address after repeating said fourth operation (m−2) times and the data stored at said (m−1)-th row address to said arithmetic operation means and providing an arithmetic operation result as a filtering output of the (m+1)-th row by said second ring type pipeline buffer; and storing data of a (2m+1)-th row of the filtering output of said first ring type pipeline buffer at an m-th row address of said second ring type pipeline buffer.

21. A data processing method comprising the steps of:

preparing a plurality of pieces of data equal to or larger than 2n which are inputted by input means; and when a filter size is represented by n, repeating one cycle of operations with respect to 2n pieces of data among said plurality of pieces of data by shifting the data by n+1 pieces of data at a time, by using a ring type pipeline buffer having at least n+2 cells and an operand interchangeable arithmetic means for performing a predetermined arithmetic operation on said input data;

said one cycle of operations comprising (a) with respect to the ring type pipeline buffer which stores first to n-th data at first to (n+1)-th addresses, excepting an n-th address;

repeating a first operation including inputting the data stored at the (n−1)-th address and the data stored at the (n+1)-th address to said arithmetic means and storing an arithmetic operation result at the n-th address (n−1) times by decrementing said (n−1)-th address and said n-th address sequentially by 1; and providing the arithmetic operation result stored at the second address at that time as a first filtering output;

(b) storing at an (n+2)-th address of said ring type pipeline buffer; and also inputting said arithmetic operation result stored at the third address and the data stored at the (n+2)-th address to said arithmetic means and providing an arithmetic operation result as a second filtering output;

(c) repeating a second operation (n−2) times, said second operation including storing (n+2)-th data at a first address of said ring type pipeline buffer;

inputting the data stored at said (n+2)-th address and the data stored at said first address to said arithmetic means and storing an arithmetic operation result thereof at said third address; and inputting the arithmetic operation result stored at the third address and an arithmetic operation result stored at a fourth address during the repetition of said first operation after repeating (n−1) times to said arithmetic operation means and providing an arithmetic operation result as a filtering output;

the repetition of said second operation of (n+2) times being performed by incrementing said first address, said third address and said fourth address sequentially by 1 from said (n+2)-th data to said (2n−1)-th data so that the arithmetic operation results obtained are provided sequentially as a third to an n-th filtering outputs; and (d) storing 2n-th data at an (n−1)-th address of said ring-type pipeline buffer;

inputting the arithmetic operation result stored at said n-th address and the data stored at said (n−1)-th address to said arithmetic means and providing an arithmetic operation result as an (n+1)-th filtering output; and storing (2n+1)-th data at the (n+1)-th address of said ring-type pipeline buffer.

22. A data processing method according to claim 21, wherein said plurality of pieces of data are expressed as a compressed code.

23. A data processing method according to claim 22, wherein each of said plurality of pieces of data is represented by a run length code row for one line.

24. A data processing method according to claim 23, wherein said predetermined arithmetic operation performs an expansion and a compression of an image on the basis of said run length code row.

25. A data processing method according to claim 23, wherein in a portion of said plurality of pieces of data, when one line is wholly white or black, n filtering outputs which are affected by the portion of said plurality of pieces of data are replaced by data representing white or black without executing said steps (a) to (d).

26. A data processing method comprising the steps of;

preparing a plurality of pieces of data equal to or larger than 2n which are inputted by input means; and when a filter size is represented by n, repeating one cycle of operations with respect to 2n pieces of data among said plurality of pieces of data by shifting n+1 pieces of data at a time;

said one cycle of operations comprising;

(a) inputting the n-th data and the (n−1)-th data to a predetermined arithmetic means and storing an arithmetic operation result thereof in a first memory means;

applying (n−2)-th to a first data to one input of said arithmetic means sequentially and applying arithmetic operation results of said arithmetic means to the other input of said arithmetic means sequentially; and providing the last arithmetic operation result as a first filtering output and storing arithmetic operations results obtained in the course of the arithmetic operations in said first memory means sequentially;

(b) inputting the last arithmetic operation result obtained in said course of arithmetic operations and the (n+1)-th data stored in said first memory means to said arithmetic means and providing an arithmetic operation result as a second filtering output;

(c) inputting the (n+1)-th data and the (n+2)-th data to said arithmetic means and storing an arithmetic operation result thereof in a second memory means; and repeating a first operation and a second operation alternatively until the (2n−1)-th data and providing third to (n−1)-th filtering outputs sequentially;

said first operation including applying the arithmetic operation result stored in said second memory means to one input of said arithmetic means and applying the rest of the arithmetic operation results obtained in said course of arithmetic operations and stored in said first memory means to the other input of said arithmetic means in a reverse order of the storing order and providing arithmetic operation results as filtering outputs;

said second operation including applying said plurality of pieces of data sequentially from $(n+3)$-th data to one input of said arithmetic means and the other arithmetic operation result stored in said second memory means to the other input of said arithmetic means and storing arithmetic operation results in said second memory means; and (d) applying the arithmetic operation result obtained as a result of said second operation performed on said $(2n-1)$-th data to one input of said arithmetic means and applying said n-th data and said 2n-th data to the other input of said arithmetic means and providing arithmetic operation results sequentially as an n-th filtering output and an $(n+1)$-th filtering output.

* * * * *